US012682930B1

(12) United States Patent
Kawabe et al.

(10) Patent No.: US 12,682,930 B1
(45) Date of Patent: Jul. 14, 2026

(54) MAGNETIC DISK DEVICE

(71) Applicants: KABUSHIKI KAISHA TOSHIBA,
Tokyo (JP); TOSHIBA ELECTRONIC DEVICES & STORAGE CORPORATION, Tokyo (JP)

(72) Inventors: Takayuki Kawabe, Sagamihara Kanagawa (JP); Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/244,454

(22) Filed: Jun. 20, 2025

(30) Foreign Application Priority Data

Mar. 19, 2025 (JP) ................................. 2025-045732

(51) Int. Cl.
| *G11B 5/54* | (2006.01) |
| *G11B 5/596* | (2006.01) |
| *G11B 19/04* | (2006.01) |

(52) U.S. Cl.
CPC .................................. *G11B 19/041* (2013.01)

(58) Field of Classification Search
CPC ........... G11B 5/00; G11B 27/36; G11B 20/18; G11B 15/04; G11B 19/04; G11B 20/00086; G11B 19/00; G11B 15/6895; G11B 5/54; G11B 5/59633; G11B 5/59638; G11B 19/045; G11B 2020/1869; G11B 5/59627; G11B 5/012; G11B 2005/0021

USPC .................................................... 360/48, 75
See application file for complete search history.

(56) References Cited

U.S. PATENT DOCUMENTS

| 7,245,447 B2 | 7/2007 | Zaitsu | |
| 8,587,889 B2 | 11/2013 | Kawabe | |
| 8,988,799 B1 | 3/2015 | Yamamoto et al. | |
| 10,163,458 B2 * | 12/2018 | Hara .................. | G11B 5/59627 |
| 11,887,633 B2 | 1/2024 | Kawabe et al. | |
| 12,112,778 B2 | 10/2024 | Vinson | |
| 2012/0081810 A1 | 4/2012 | Kawabe | |
| 2012/0307400 A1 | 12/2012 | Kawabe | |
| 2018/0088838 A1 | 3/2018 | Sato | |
| 2023/0282228 A1 | 9/2023 | Kawabe et al. | |

FOREIGN PATENT DOCUMENTS

| JP | 2012-079387 A | 4/2012 |
| JP | 2012-252732 A | 12/2012 |
| JP | 2023-127528 A | 9/2023 |

* cited by examiner

*Primary Examiner* — Nabil Z Hindi
(74) *Attorney, Agent, or Firm* — Knobbe Martens, Olson & Bear, LLP

(57) ABSTRACT

According to one embodiment, a magnetic disk device includes a disk, a head, a read processing unit, a write processing unit, an adjustment unit, and a determination unit. The adjustment unit can adjust the current first assurance position and the current first write suspending position. When the determination unit determines that the data is written to the target sector, the adjustment unit is capable of tightening each of the current first assurance position and the current first write suspending position. When the determination unit further determines that the position of the write head has exceeded the current first write suspending position, the write processing unit suspends write processing.

13 Claims, 17 Drawing Sheets

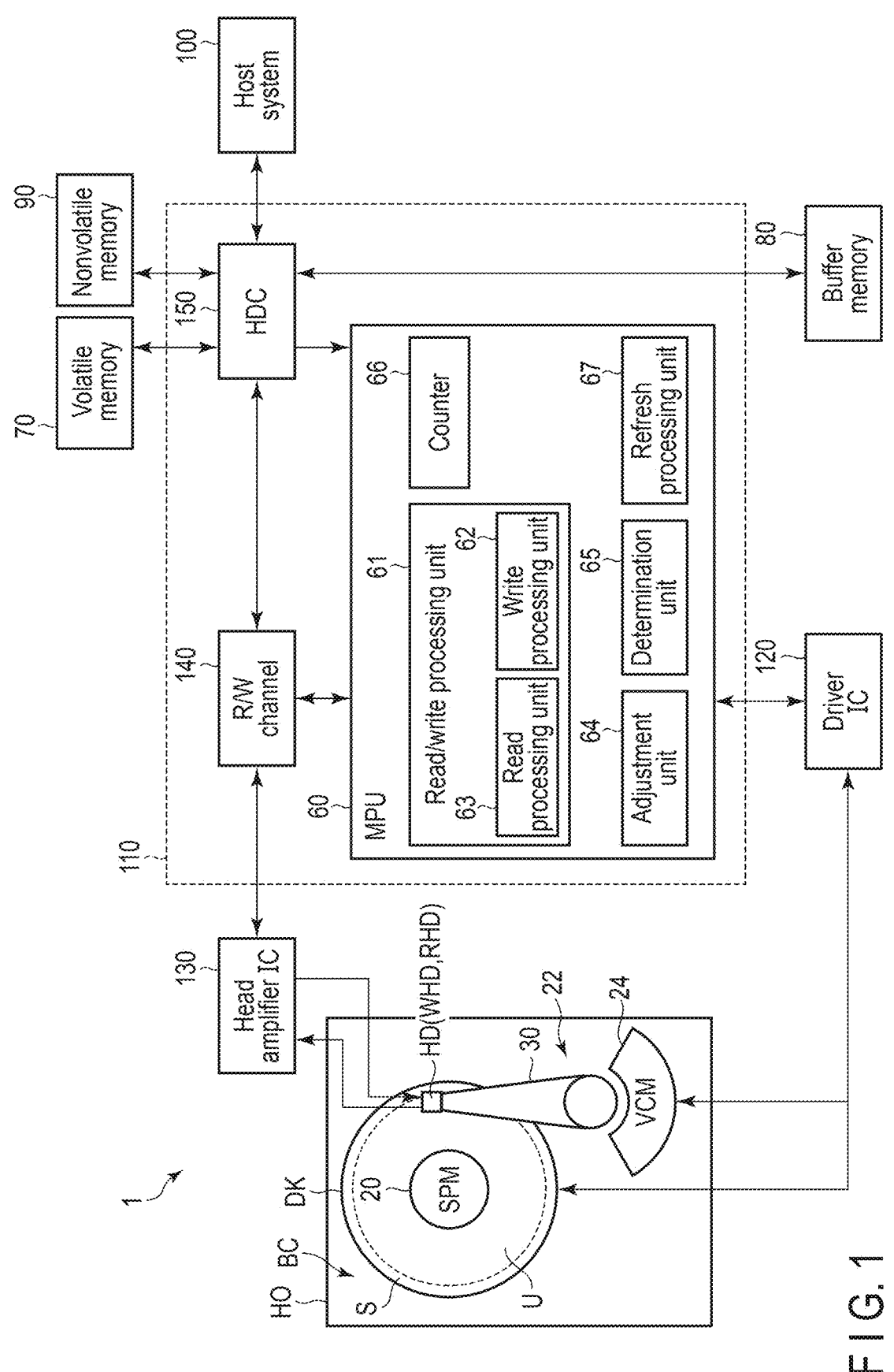
F I G. 1

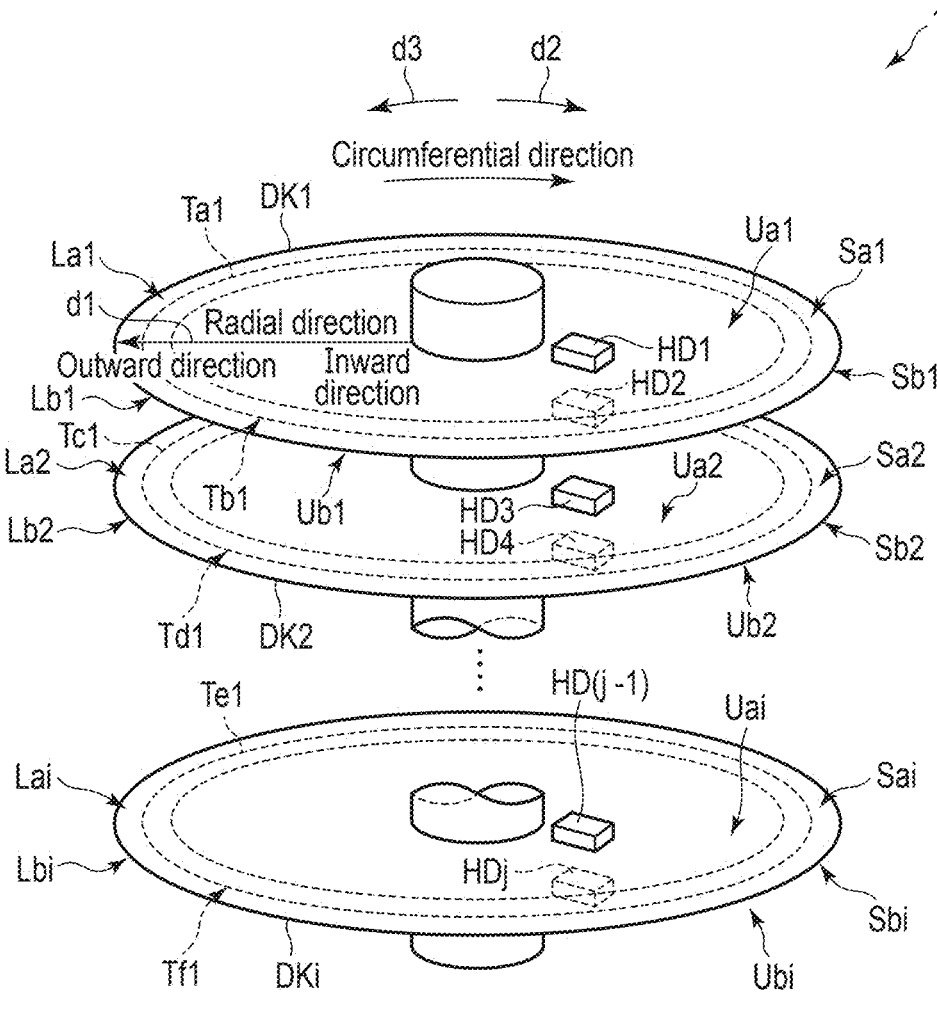
F I G. 2

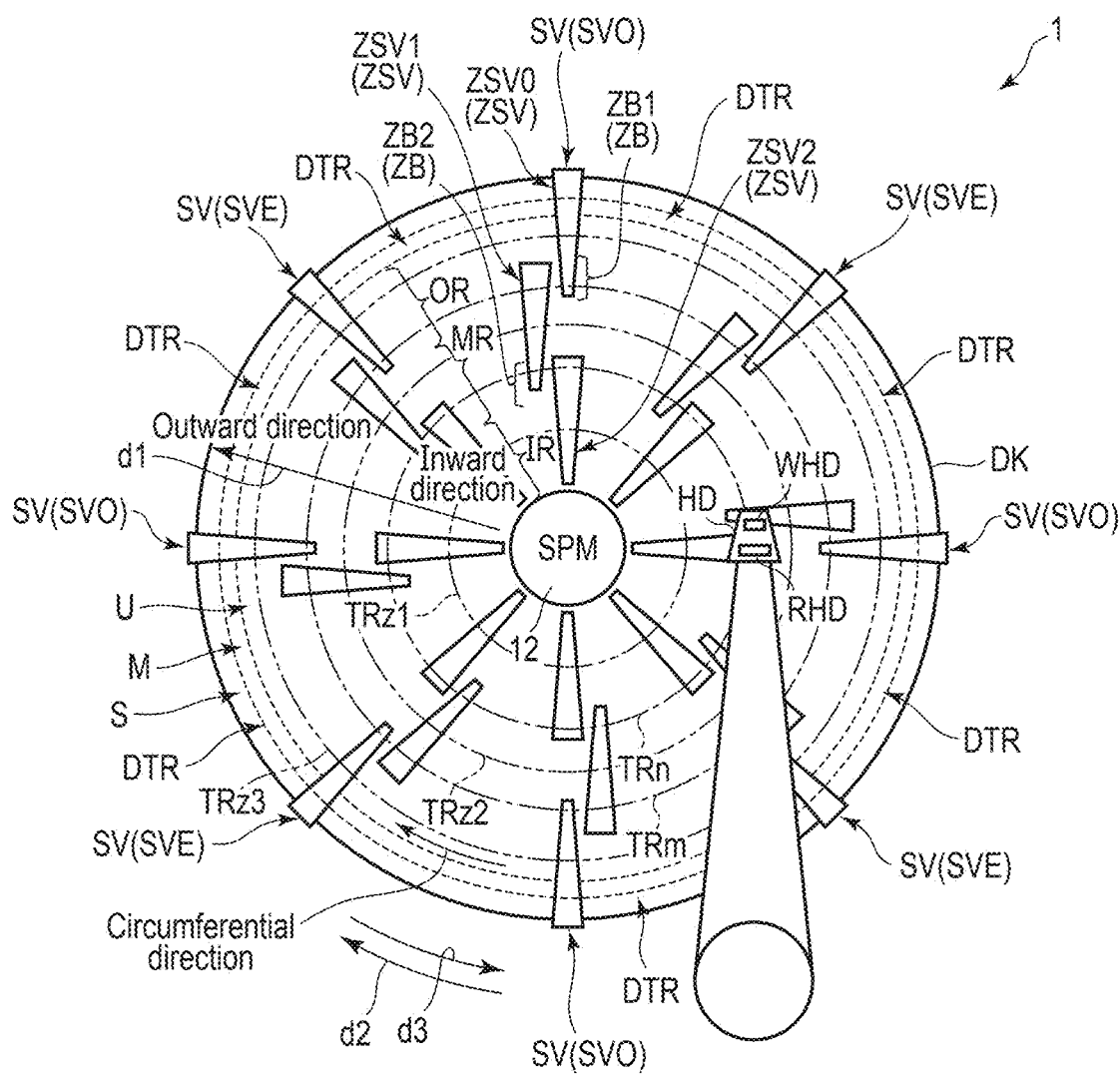
F I G . 3

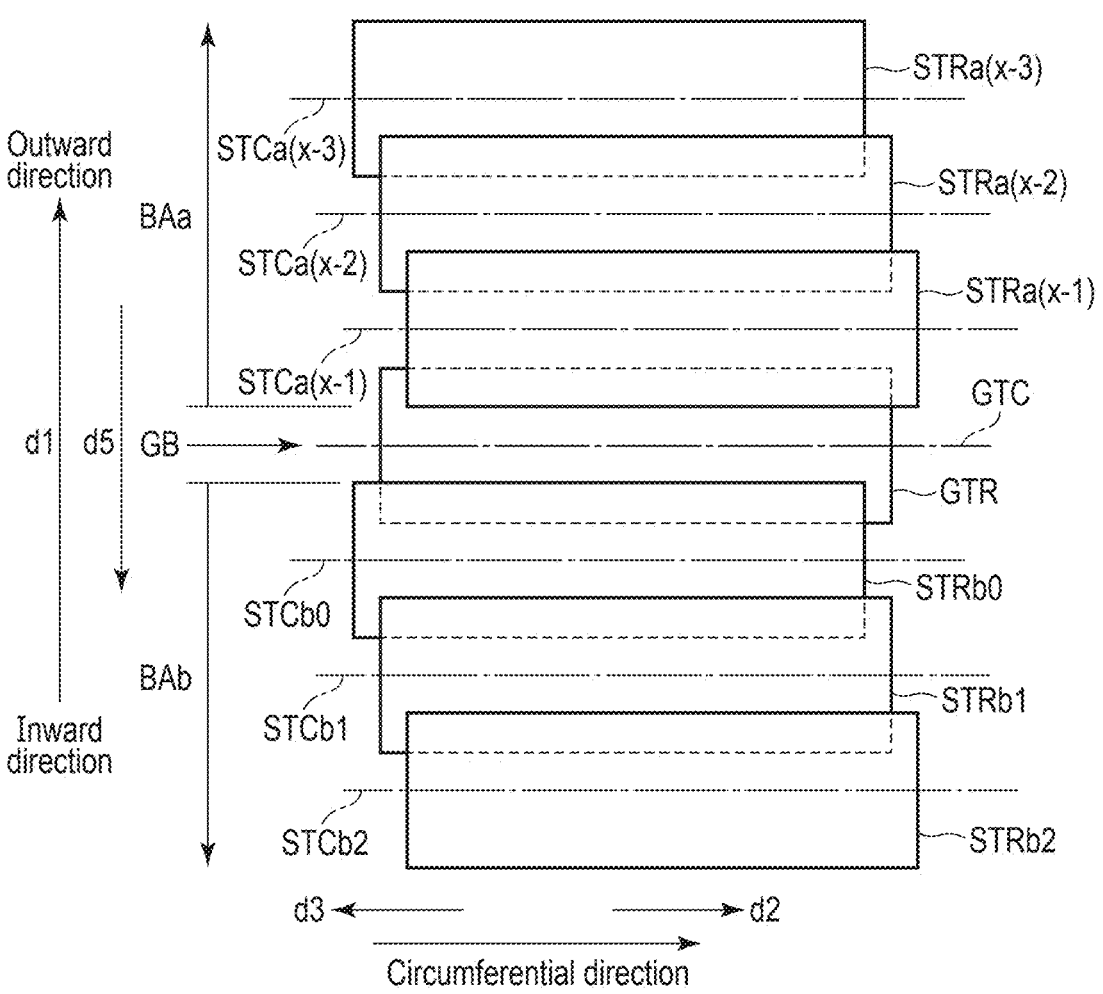
F I G. 7
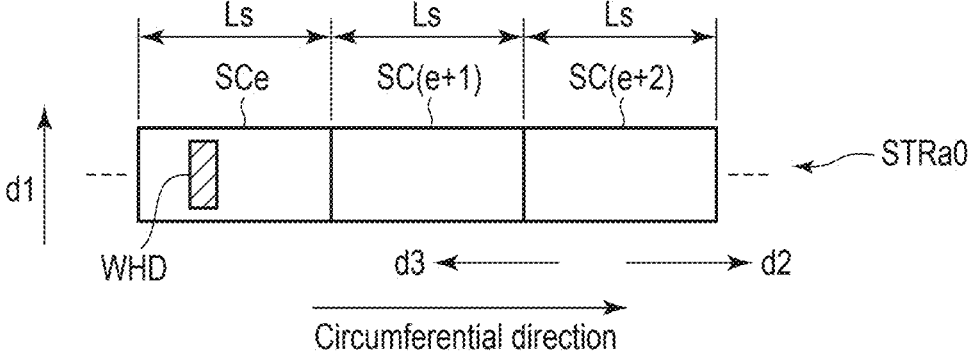
F I G. 8

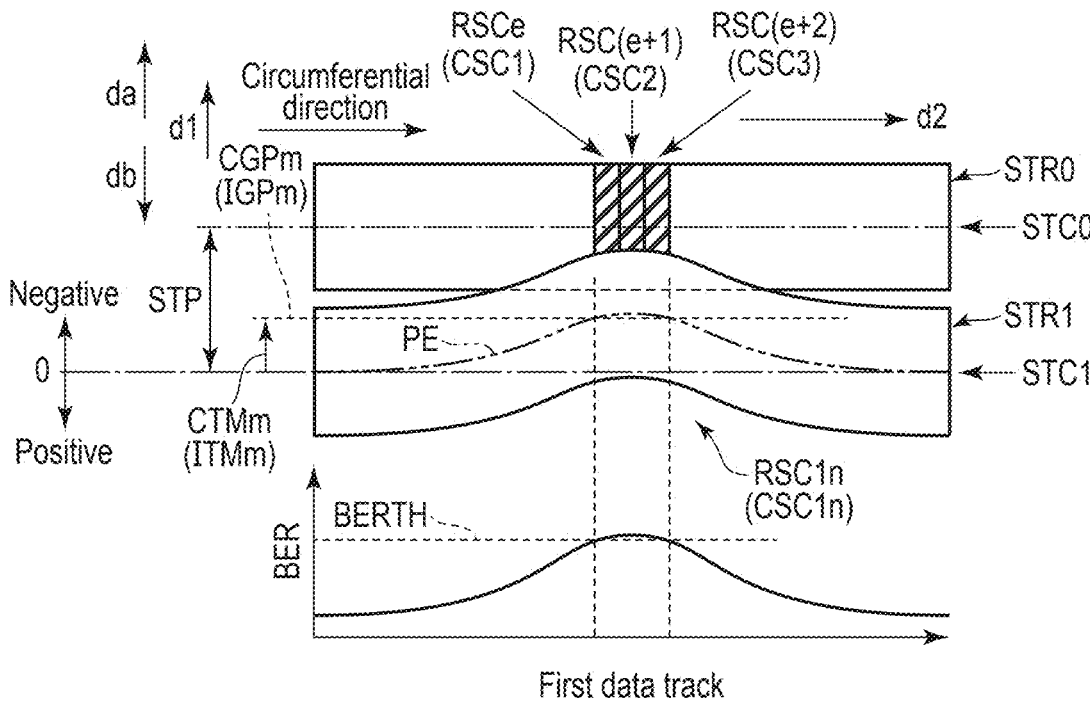
F I G. 10A
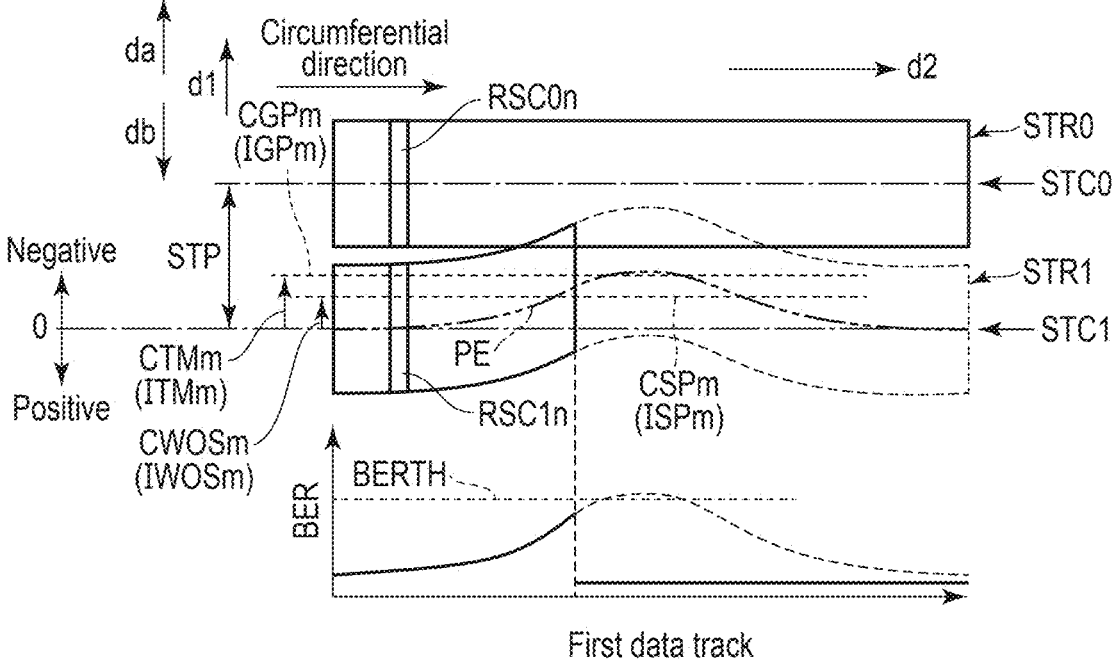
F I G. 10B

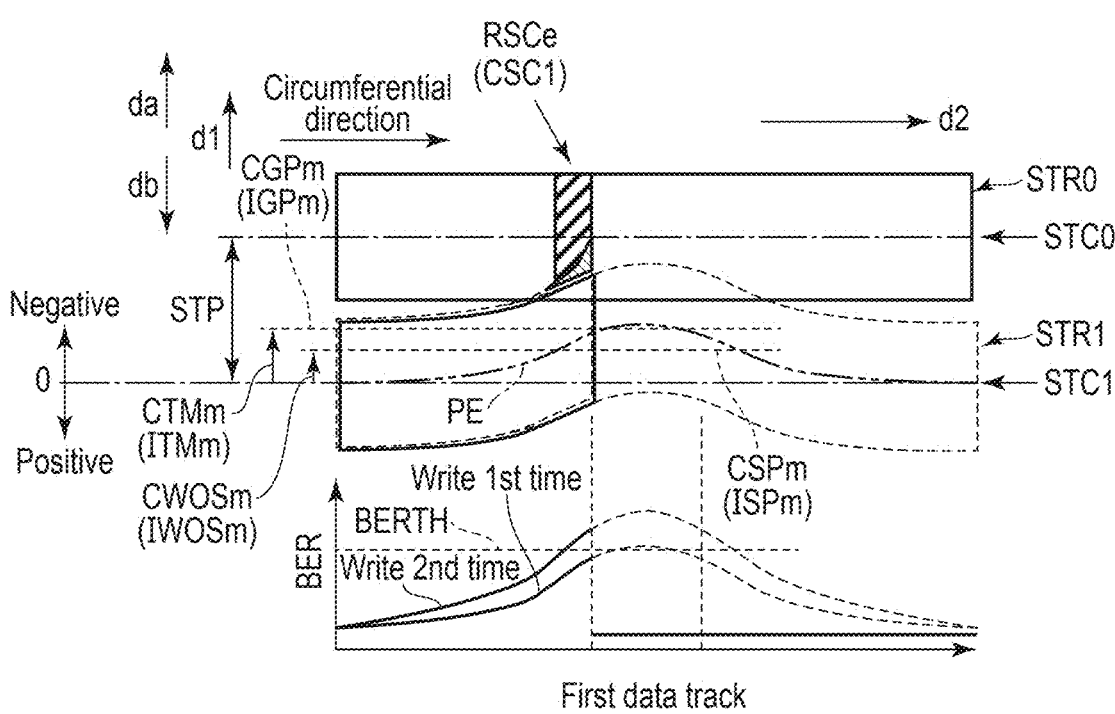
F I G. 10C
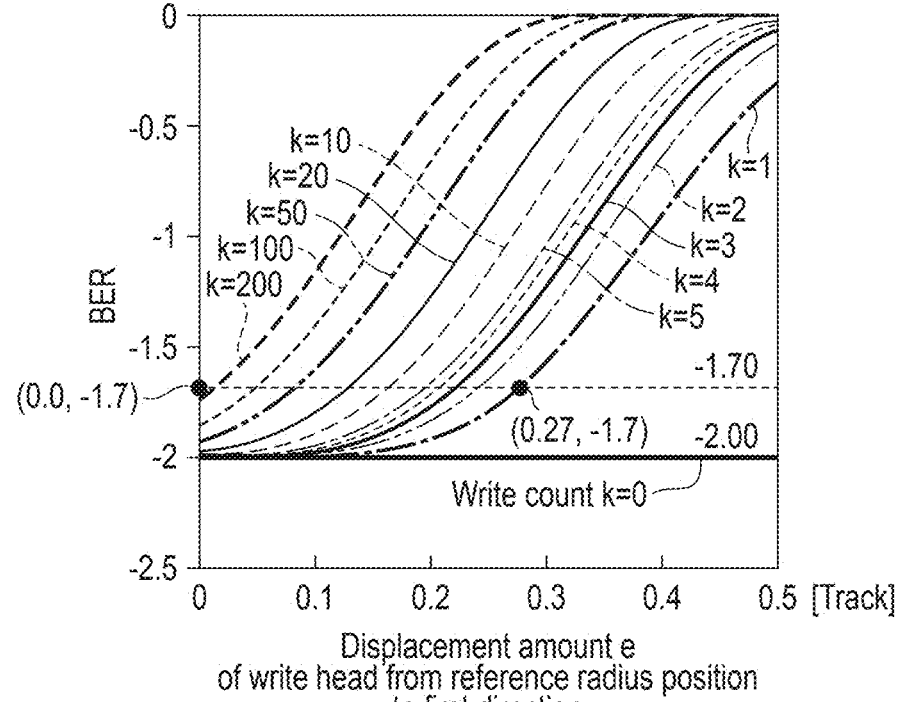
Displacement amount e
of write head from reference radius position
to first direction
F I G. 11

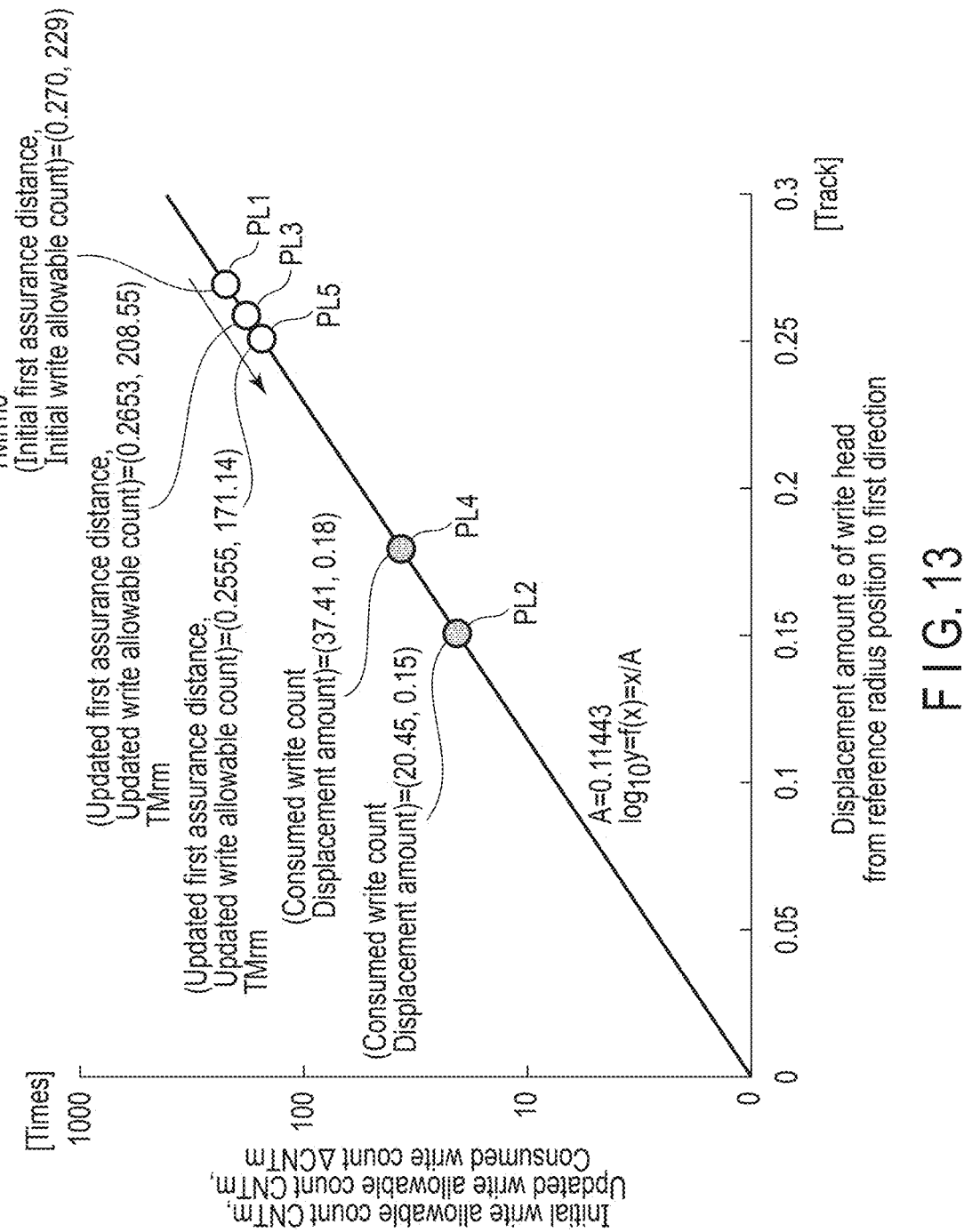
F I G. 13

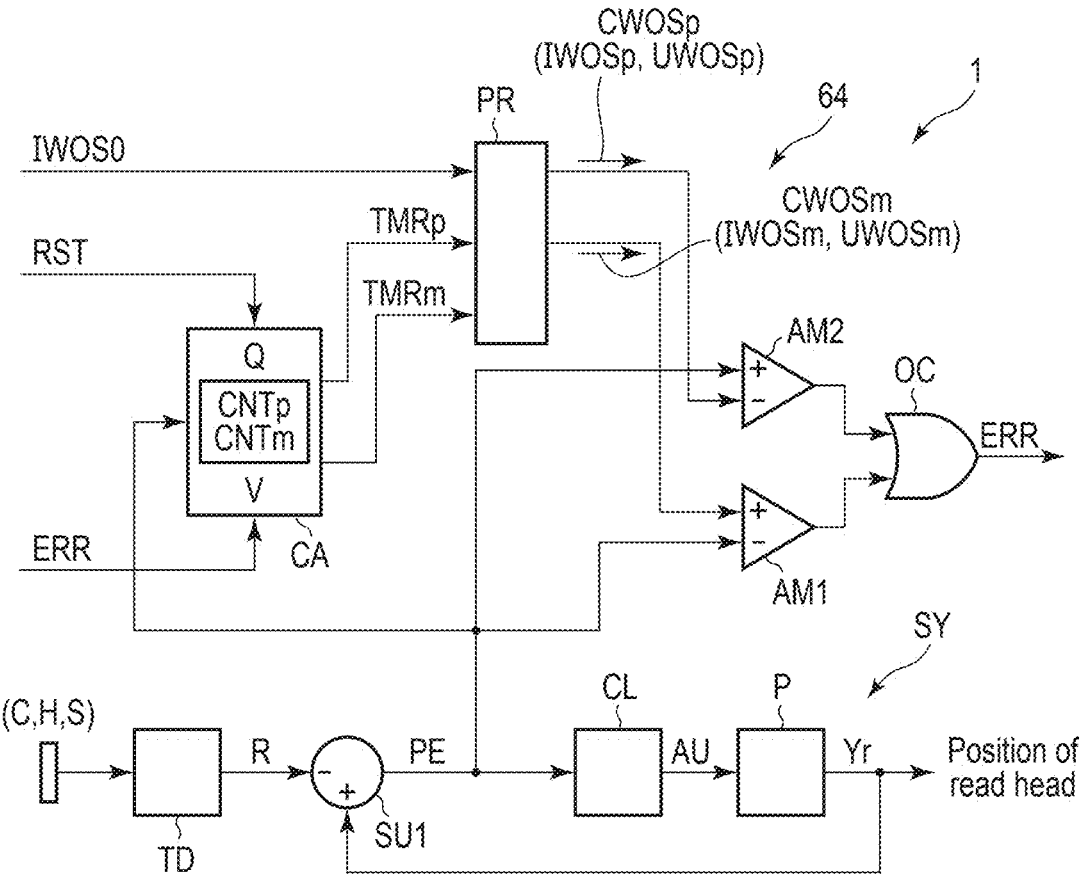
F I G. 14

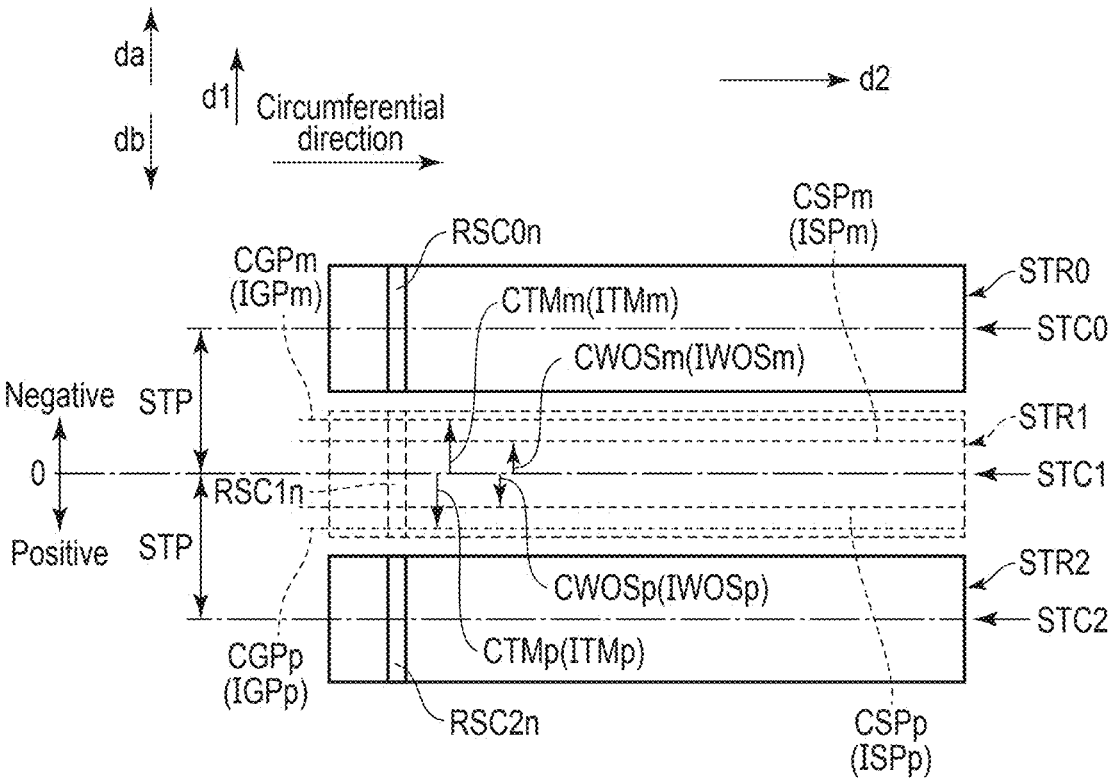
F I G. 15

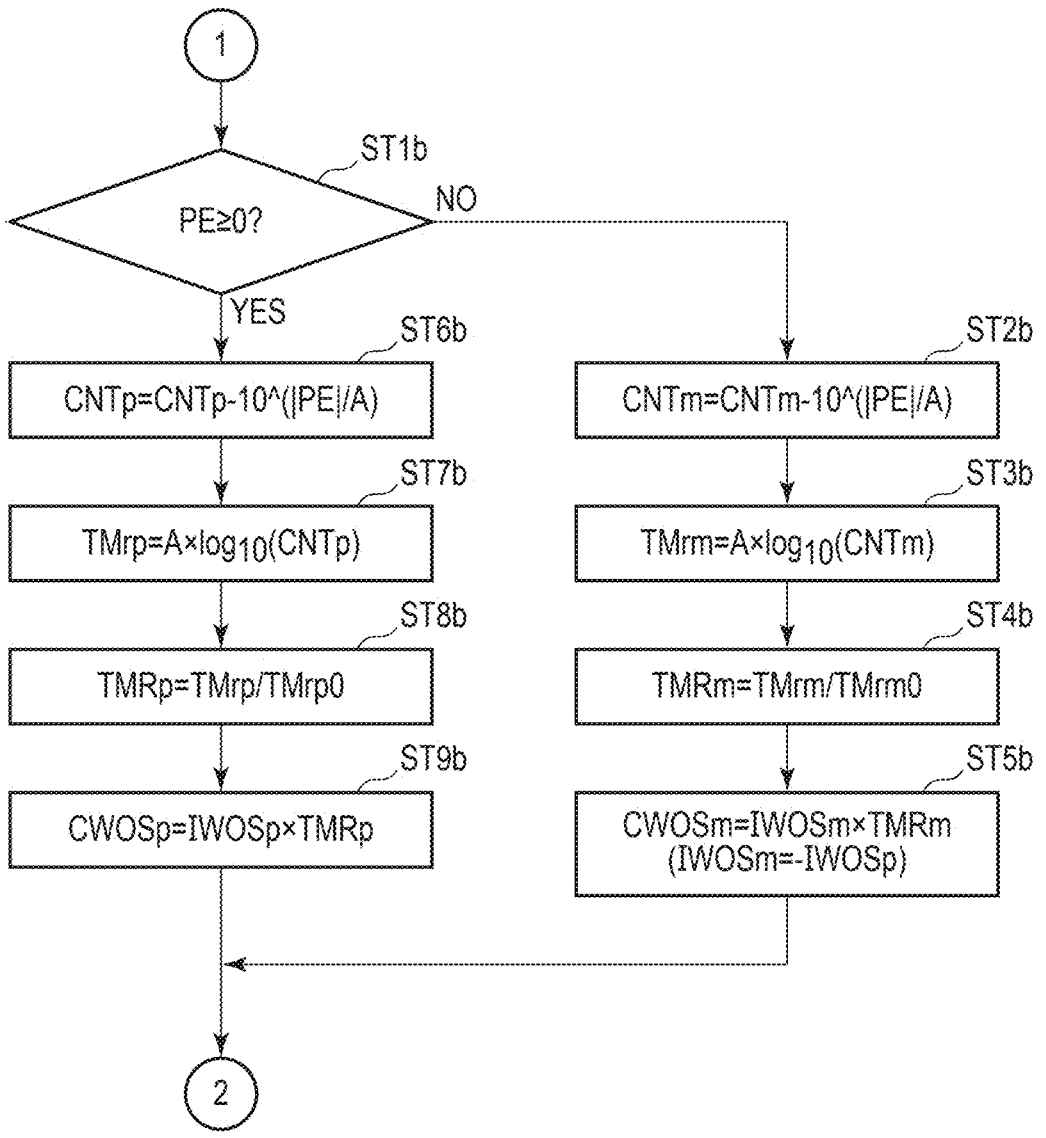
F I G. 16B

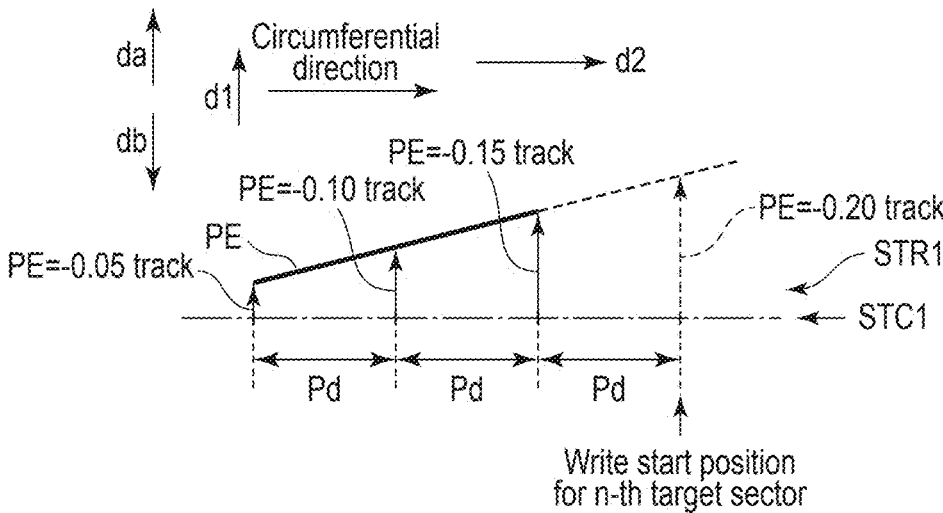
F I G. 17A
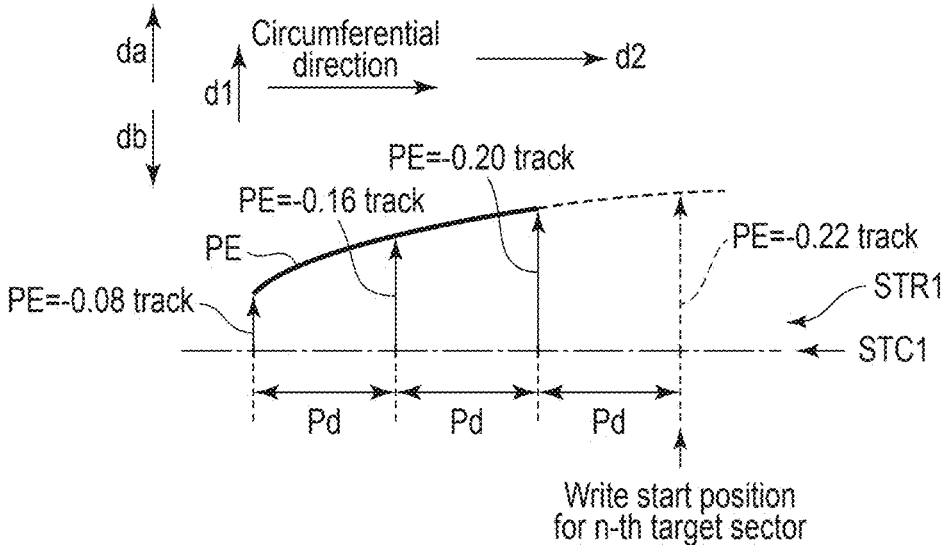
F I G. 17B

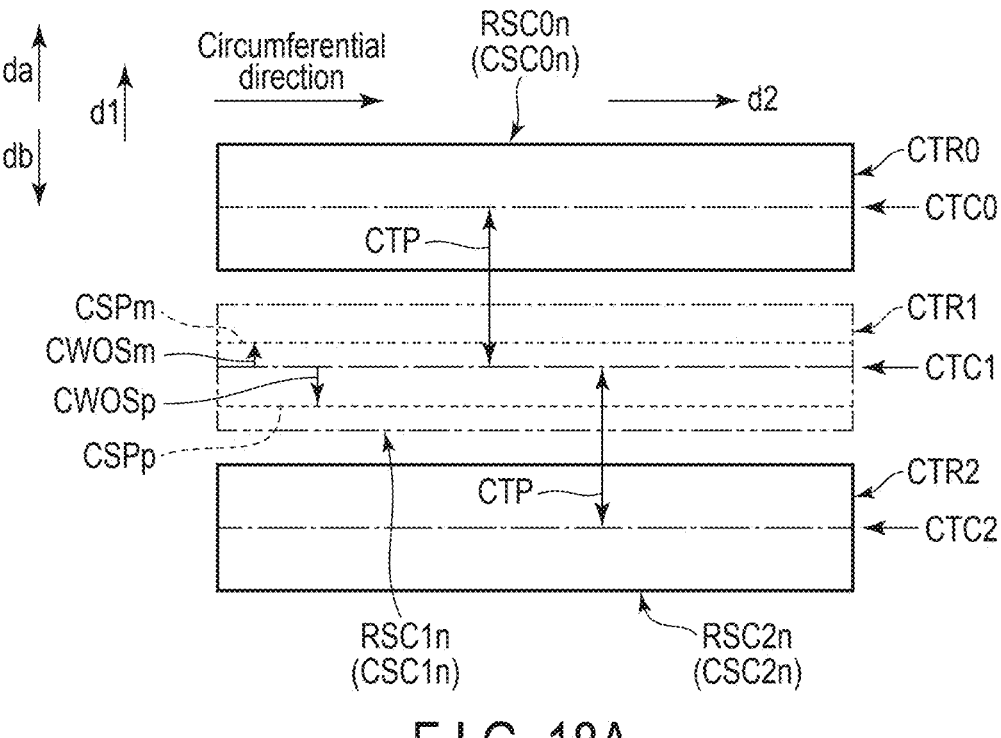
F I G. 18A
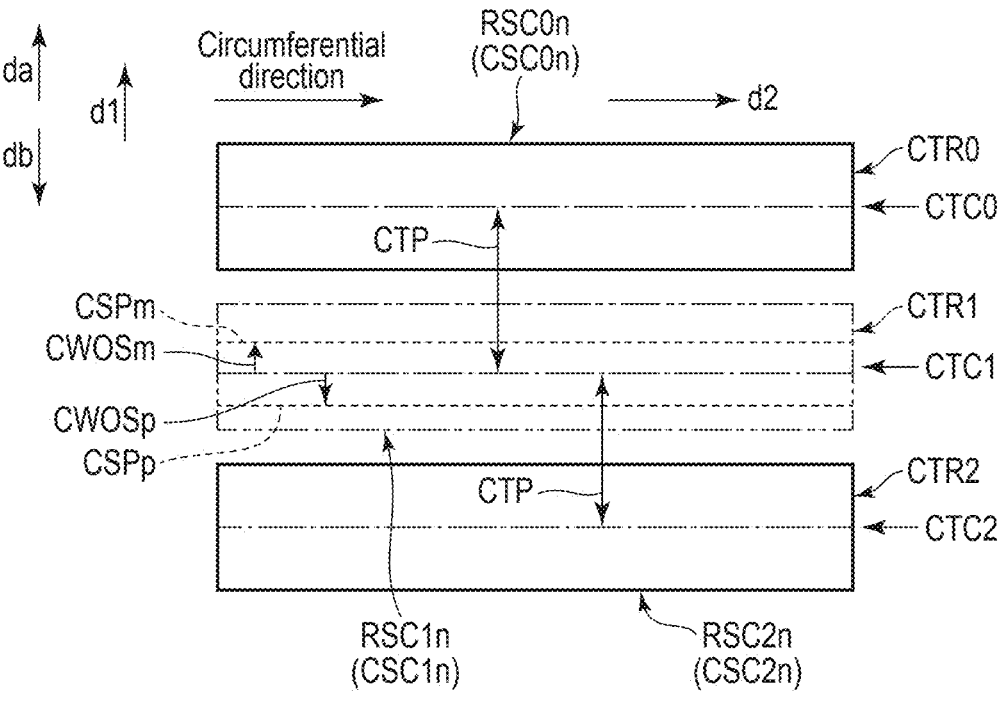
F I G. 18B

MAGNETIC DISK DEVICE

CROSS-REFERENCE TO RELATED APPLICATIONS

This application is based upon and claims the benefit of priority from Japanese Patent Application No. 2025-045732, filed Mar. 19, 2025, the entire contents of which are incorporated herein by reference.

FIELD

Embodiments described herein relate generally to a magnetic disk device.

BACKGROUND

Magnetic disk devices such as Conventional Magnetic Recording (CMR) (or conventional recording) magnetic disk devices that write data to a plurality of tracks at intervals in the radial direction of the disk, Shingled Magnetic Recording (SMR) magnetic disk devices that overwrite data to a plurality of tracks in the radial direction of the disk, and hybrid recording type magnetic disk devices that selectively perform the conventional magnetic recording and the shingled magnetic recording, are known.

BRIEF DESCRIPTION OF THE DRAWINGS

FIG. 1 is a block diagram showing a configuration of a magnetic disk device according to a first embodiment.

FIG. 2 is a perspective view showing parts of the magnetic disk device, illustrating a plurality of disks and a plurality of heads.

FIG. 3 is a schematic diagram showing an example of arrangement of a plurality of servo areas and a plurality of data areas on a single disk according to the embodiment.

FIG. 7 is a schematic diagram showing two bands and one guard band of the user data area shown in FIG. 6.

FIG. 8 is a schematic diagram showing three sectors of one track of the band shown in FIG. 6.

FIG. 10A is a schematic diagram showing an example of a first track and a second track of the magnetic disk device, illustrating a state in which the target sector of the first track becomes a corrupted target sector when the write head exceeds an initial first assurance position during write processing on the second track, and showing the variation in BER to the first track in graph form.

FIG. 10B is a schematic diagram showing an example of the first track and the second track of the magnetic disk device, illustrating a state in which the target sector of the first track does not become a corrupted target sector since the write processing is suspended when the write head exceeds an initial first write suspending position during write processing in the second track, and showing the variation in BER to the first track in graph form.

FIG. 10C is a schematic diagram showing an example of the first track and the second track of the magnetic disk device, illustrating a state in which the target sector of the first track becomes a corrupted target sector although the write processing is suspended when the write head exceeds an initial first write suspending position during write retry processing in the second track, and showing the variation in BER to the first track in graph form.

FIG. 11 is a graph showing a variation of BER to a displacement amount of the write head from a reference radius position to a first direction at every write count.

FIG. 13 is a graph showing variation in the initial write permission count and the initial first assurance distance, and the variation in the update write permission count and the consumed write count with respect to the above displacement amount, as plots.

FIG. 14 is a block diagram showing an example of a head positioning control system and an adjustment unit.

FIG. 15 is a schematic diagram showing an example of the first track, the second track, and the third track of the magnetic disk device, illustrating not only a negative index, but also a positive index during write processing in the second track.

FIG. 16B is a flowchart showing the write processing method following FIG. 16A.

FIG. 17A is a schematic diagram showing an example of deriving a positioning error which is expected when writing data to the n-th target sector in a magnetic disk device according to the second embodiment, illustrating the positioning error detected at regular intervals during a specific period immediately before writing data to the n-th target sector in the second data track and the positioning error which is expected when writing data to the n-th target sector.

FIG. 17B is a schematic diagram showing another example of deriving a positioning error which is expected when writing data to the n-th target sector in a magnetic disk device according to the second embodiment, illustrating the positioning error detected at regular intervals during a specific period immediately before writing data to the n-th target sector in the second data track and the positioning error which is expected when writing data to the n-th target sector.

FIG. 18A is a schematic diagram showing an example of the n-th target sector in each of the first track, the second track, and the third track of the magnetic disk device according to a third embodiment, illustrating a state in which a distance from the target position of the write head to a current first write suspending position is different from a distance from the target position to a current second write suspending position.

FIG. 18B is a schematic diagram showing an example of the n-th target sector in each of the first track, the second track, and the third track of the magnetic disk device according to a third embodiment, illustrating a state in which a distance from the target position of the write head to a current first write suspending position is equal to a distance from the target position to a current second write suspending position.

DETAILED DESCRIPTION

Figure 4:
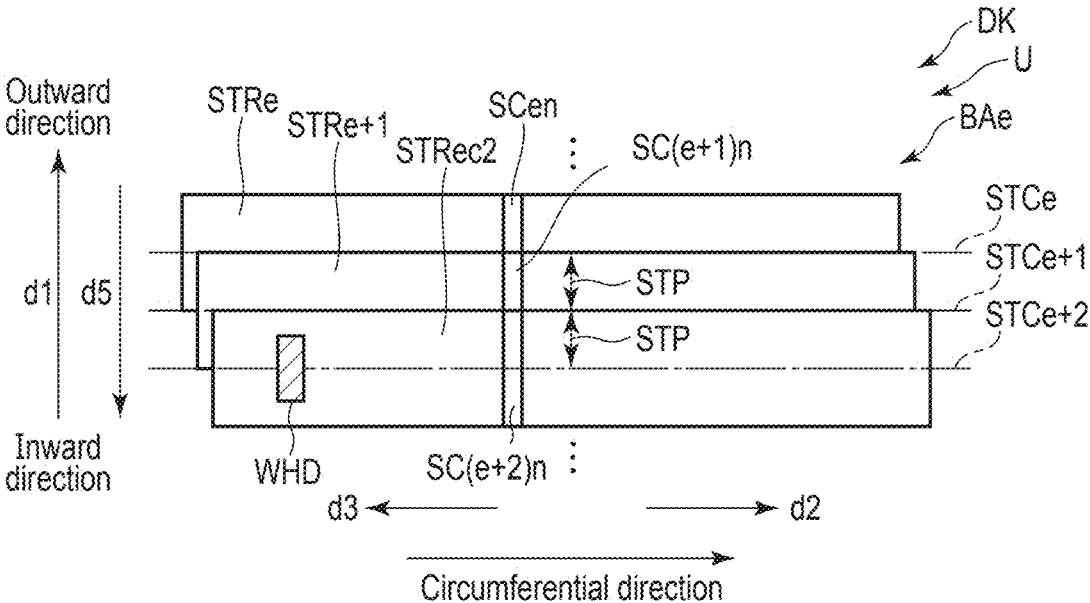
FIG. 4 is a schematic diagram showing three tracks where shingled magnetic recording of a user data area of the disk shown in FIG. 3 is performed, and a write head.

In general, according to one embodiment, there is provided a magnetic disk device comprising: a disk having a first data track and a second data track adjacent to each other in a recording layer, the first data track and the second data track each including a plurality of target sectors being targets to which data are to be written, an n-th target sector of the first data track being adjacent to an n-th target sector of the second data track in a radial direction of the disk, the first data track being located in a first direction parallel to the radial direction with respect to the second data track; a head including a write head writing data to the recording layer and a read head reading data from the recording layer; a read processing unit which derives position information on the write head in the radial direction by seeking the read head and which reads the data written to the recording layer; a write processing unit executes write processing of writing data to the recording layer, and setting a target position of the write head in the radial direction to a reference radius position when writing data to the n-th target sector of the second data track; an adjustment unit capable of adjusting a current first assurance position which is located in the first direction relative to the reference radius position, and a current first write suspending position which is located between the reference radius position and the current first assurance position, the current first assurance position being a limit position of the write head, which assures enabling data of the n-th target sector of the first data track to be read, the current first write suspending position being a limit position of the write head in the first direction where writing data to the n-th target sector of the second data track can be permitted; and a determination unit. When the determination unit determines that data has been written to the n-th target sector of the second data track, the adjustment unit is capable of tightening each of the current first assurance position and the current first write suspending position, and updating the positions to positions displaced toward the reference radius position side. When the determination unit further determines that the position of the write head has exceeded the current first write suspending position, the write processing unit suspends write processing.

First Embodiment

A magnetic disk device 1 according to a first embodiment will be described hereinafter with reference to the accompanying drawings. First, a configuration of the magnetic disk device 1 will be described. FIG. 1 is a block diagram showing a configuration of the magnetic disk device 1 according to the first embodiment. In the present embodiment, the magnetic disk device 1 is a hybrid recording magnetic disk device that selectively performs the conventional magnetic recording and the shingled magnetic recording. However, a technique to be described below may be applied to a magnetic disk device of the shingled magnetic recording or a magnetic disk device of the conventional magnetic recording.

As shown in FIG. 1, the magnetic disk device 1 comprises a plurality of, for example, one to eleven disks (magnetic disks) DK serving as recording media, a spindle motor (SPM) 20 serving as a drive motor, a head stack assembly 22, a driver IC 120, a head amplifier integrated circuit (hereinafter referred to as a head amplifier IC or preamplifier) 130, a volatile memory 70, a buffer memory (buffer) 80, a nonvolatile memory 90, and a system controller 110 that is a single-chip integrated circuit. In addition, the magnetic disk device 1 is connected to a host system (hereinafter simply referred to as a host) 100.

Each of the disks DK is formed to have a diameter of, for example, 97 mm (3.8 inches) and has recording layers (magnetic recording layers) on both sides. Incidentally, in the first embodiment, the magnetic disk device 1 comprises one to eleven disks DK. However, the number of disks DK is not limited to these.

The head stack assembly 22 can control a head HD mounted on an arm 30 to move, i.e., seek to a target position on the disk DK by driving a voice coil motor (hereinafter referred to as VCM) 24.

A user data area U that can be used for the user, and a system area S where information necessary for the system management is written are assigned to the area of the disk DK where the data can be written.

The head HD records and reproduces information on the disk DK. The head HD comprises a slider as a main body, and comprises a write head WHD and a read head RHD that are mounted on the slider. The write head WHD writes the data to the recording layer of the disk DK. The read head RHD reads the data from data tracks of the recording layer of the disk DK.

The "central part of the head WHD" may be referred to as the "head HD", the "central part of the write head WHD" may be referred to as the "write head WHD", and the "central part of the read head RHD" may be referred to as the "read head RHD". The "central part of the write head WHD" may be referred to simply as the "head HD", and the "central part of the read head RHD" may be referred to simply as the "head HD".

The driver IC 120 controls driving the SPM 20 and the VCM 24 under control of the system controller 110 (more specifically, MPU 60 to be described later). The SPM 20 supports and rotates a plurality of disks DK.

The disk DK, the SPM 20, and the head stack assembly 22 are accommodated in a housing HO, and are supported by a base BC of the housing HO.

The head amplifier IC 130 comprises a read amplifier and a write driver. The read amplifier amplifies a read signal read from the disk DK and outputs the amplified read signal to the system controller 110 (more specifically, a read/write (R/W) channel 140 to be described later). The write driver outputs a write current corresponding to a signal output from the R/W channel 140 to the head HD.

The volatile memory 70 is a semiconductor memory where the stored data is lost when power supply is cut off. The volatile memory 70 stores data and the like necessary for processing in each of units of the magnetic disk device 1. The volatile memory 70 is a random access memory (RAN). The volatile memory 70 is, for example, a dynamic random access memory (DRAM). However, the volatile memory 70 may be a synchronous dynamic random access memory (SDRAM).

The buffer memory 80 is a semiconductor memory which temporarily records data and the like transmitted and received between the magnetic disk device 1 and the host 100. Incidentally, the buffer memory 80 may be formed integrally with the volatile memory 70. The buffer memory 80 is a volatile RAM. Examples of the buffer memory 80 are a DRAM, a static random access memory (SRAM), an SDRAM, a ferroelectric random access memory (FeRAM), a magnetoresistive random access memory (MRAM), and the like.

The buffer memory 80 includes areas used as a read cache and a write cache, and temporarily stores commands and the like, which are received from the host 100.

The nonvolatile memory 90 is a semiconductor memory which records data stored even when power supply is cut off. The nonvolatile memory 90 is, for example, a NAND flash read only memory (FROM). However, the nonvolatile memory 90 may also be a NOR FROM.

The system controller (controller) 110 is realized by, for example, using a large scale integrated circuit (LSI) referred to as a system-on-a-chip (SoC) in which a plurality of elements are integrated on a single chip. The system controller 110 includes a read/write (R/W) channel 140, a hard disk controller (HDC) 150, and a microprocessor (MPU) 60. The system controller 110 is electrically connected to the driver IC 120, the head amplifier IC 130, the volatile memory 70, the buffer memory 80, the nonvolatile memory 90, a sensor SEN, and the host 100.

The R/W channel 140 executes signal processing of read data transferred from the disk DK to the host 100 and write data transferred from the host 100 in accordance with instructions from the MPU 60 to be described later. The R/W channel 140 comprises a circuit or function of modulating the write data. In addition, the R/W channel 140 comprises a circuit or a function of measuring the signal quality of the read data. The R/W channel 140 is electrically connected to, for example, the head amplifier IC 130, the HDC 150, the MPU 60 and the like.

The HDC 150 controls data transfer between the host 100 and the R/W channel 140 in response to an instruction from the MPU 60 to be described later. The HDC 150 is electrically connected to, for example, the R/W channel 140, the MPU 60, the volatile memory 70, the buffer memory 80, the nonvolatile memory 90, and the like.

The HDC 150 includes a gate generation unit. In accordance with the commands from the host 100, instructions from the MPU 60, and the like, the gate generation unit generates various gates, for example, a write gate, a read gate, a servo gate, and the like and outputs the gates to the R/W channel 140, for example, the gate detection unit. In the following descriptions, "activating a predetermined gate" may be referred to as "asserting a predetermined gate". In addition, "falling down a predetermined gate" may be referred to as "negating the predetermined gate". In addition, "asserting a predetermined gate" and "negating a predetermined gate" may imply the meaning "generating a predetermined gate". Incidentally, the gate generation unit may be included in the R/W channel 140 or the MPU 60.

The R/W channel 140 includes a gate detection unit. The gate detection unit detects whether various gates, for example, the write gate, the read gate, the servo gate, and the like are in an asserted state or a negated state.

For example, the gate detection unit executes the write processing when detecting that the write gate is asserted, and suspends (stops) the write processing when detecting that the write gate is negated.

In addition, the gate detection unit executes the read processing when detecting that the read gate is asserted, and stops the read processing when detecting that the read gate is negated. The gate detection unit executes the servo read processing when detecting that the servo gate is asserted, and stops the servo read processing when detecting that the servo gate is negated. Incidentally, the gate detection unit may be provided inside the HDC 150 or the MPU 60.

The MPU 60 is a control unit or main controller which controls each of units of the magnetic disk device 1. The MPU 60 controls the VCM 24 via the driver IC 120 to execute servo control for positioning the head HD. The MPU 60 controls the operation of writing the data to the disk DK and selects a storage destination of the write data transferred from the host 100. In addition, the MPU 60 controls the operation of reading the data from the disk DK and controls the processing of the read data transferred from the disk DK to the host 100. The MPU 60 is connected to each unit of the magnetic disk device 1. The MPU 60 is electrically connected to, for example, the driver IC 120, the R/W channel 140, the HDC 150, the sensor SEN, and the like.

The MPU 60 comprises a read/write processing unit 61, an adjustment unit 64, a determination unit 65, a counter 66, a refresh processing unit 67, and the like. The MPU 60 performs on firmware the processing of these units, for example, the read/write processing unit 61, the adjustment unit 64, the determination unit 65, the counter 66, the refresh processing unit 67, and the like. Incidentally, the MPU 60 may comprise each of these units as a circuit.

The read/write processing unit 61 includes a write processing unit 62 and a read processing unit 63. According to the commands from the host 100, the wright processing unit 62 controls the data write processing and can perform the write processing to cause the write head WHD to write the data to the recording layer of the disk DK, and the read processing unit 63 controls the data read processing and can perform the read processing to cause the read head RHD to read the data from the recording layer of the disk DK. For example, the read processing unit 63 can seek the read head RHD to derive position information of the write head WHD in a radial direction d1. The read/write processing unit 61 controls the VCM 24 via the driver IC 120, positions the head HD at a target position (predetermined radial position) on the disk DK, and performs the read processing or the write processing.

The determination unit 65 permits the write processing unit 62 to perform the write processing during a period when the determination unit 65 determines that the vibration of the head HD does not exceed a standard vibration level, and prohibits the write processing unit 62 to perform the write processing during a period when the determination unit 65 determines that the vibration of the head HD exceeds the standard vibration level. The determination unit 65 can determine whether to suspend the write processing, based on the vibration information of the head HD. Incidentally, the determination unit 65 can also determine whether to suspend the read processing, based on the vibration information of the head HD.

Incidentally, details of the operations of the read/write processing unit 61, the adjustment unit 64, the determination unit 65, the counter 66, and the refresh processing unit 67 will be described later.

FIG. 2 is a perspective view showing parts of the magnetic disk device 1, illustrating a plurality of disks DK and a plurality of heads HD.

As shown in FIG. 2, the rotation of direction of the disks DK in the circumferential direction is referred to as a rotational direction d3. Incidentally, in the example shown in FIG. 2, the rotational direction d3 is illustrated as a counterclockwise direction, but may be an opposite (clockwise) direction. In addition, a direction of travel d2 of the heads HD relative to the disks DK is opposite to the rotational direction d3. The direction of travel d2 is the direction in which the heads HD sequentially write the data to and read data from the disks DK in the circumferential direction, i.e., the direction in which the heads HD travel with respect to the disks DK in the circumferential direction.

The magnetic disk device 1 comprises i disks, from disk DK1 through disk DKi, and j heads, from head HD1 through head HDj. In the present embodiment, the number of heads HD is twice the number of disks DK (j=2×i).

The disks DK1 through DKi are provided coaxially to be spaced apart from each other at intervals and overlap with each other. The diameters of the disks DK1 to DKi are the same as each other. The terms "same", "identical", "matching", "equivalent" and the like imply not only the meaning of being exactly the same, but also the meaning of being different to the extent that they can be regarded as substantially the same. Incidentally, the diameters of the disks DK1 to DKi may be different from each other.

Each of the disks DK has recording layers L on both sides. For example, the disk DK1 has a first recording layer La1 and a second recording layer Lb1 on the side opposite to the first recording layer La1. The disk DK2 has a first recording layer La2 and a second recording layer Lb2 on the side opposite to the first recording layer La2. The disk DKi has a first recording layer Lai and a second recording layer Lb1 on the side opposite to the first recording layer Lai. Each first recording layer La may be referred to as a front surface or a recording surface. Each second recording layer Lb may be referred to as a back surface or a recording surface.

However, each first recording layer La may be referred to as a back surface. In this case, each second recording layer Lb may be referred to as a front surface.

Each of the recording layers L includes a user data area U and a system area S. The first recording layer La1 includes a user data area Ua1 and a system area Sa1. The second recording layer Lb1 includes a user data area Ub1 and a system area Sb1. The first recording layer La2 includes a user data area Ua2 and a system area Sa2. The second recording layer Lb2 includes a user data area Ub2 and a system area Sb2. The first recording layer Lai includes a user data area Uai and a system area Sai. The second recording layer Lbi includes a user data area Ubi and a system area Sbi.

A track sandwiched between double broken lines in the figure, of the user data area Ua1 (first recording layer La1), is referred to as track Ta1. A track located on a side opposite to the track Ta1, of the user data area Ub1 (second recording layer Lb1), is referred to as track Tb1.

A track sandwiched between double broken lines in the figure, of the user data area Ua2 (first recording layer La2), is referred to as track Tc1. A track located on a side opposite to the track Tc1, of the user data area Ub2 (second recording layer Lb2), is referred to as track Td1.

A track sandwiched between double broken lines in the figure, of the user data area Uai (first recording layer Lai), is referred to as track Te1. A track located on a side opposite to the track Te1, of the user data area Ubi (second recording layer Lbi), is referred to as track Tf1.

In the present embodiment, the tracks Ta1, Tb1, Tc1, Td1, Te1, and Tf1 are located on the same cylinder.

The heads HD face the disks DK. In the present embodiment, one head HD faces each of the recording layers L of the disk DK. For example, the head HD1 faces the first recording layer La1 of the disk DK1, writes the data to the first recording layer La1, and reads the data from the first recording layer La1. The head HD2 faces the second recording layer Lb1 of the disk DK1, writes the data to the second recording layer Lb1, and reads the data from the second recording layer Lb1.

The head HD3 faces the first recording layer La2 of the disk DK2, writes the data to the first recording layer La2, and reads the data from the first recording layer La2. The head HD4 faces the second recording layer Lb2 of the disk DK2, writes the data to the second recording layer Lb2, and reads the data from the second recording layer Lb2. The head HDj−1 faces the first recording layer Lai of the disk DKi, writes the data to the first recording layer Lai, and reads the data from the first recording layer Lai. The head HDj faces the second recording layer Lbi of the disk DKi, writes the data to the second recording layer Lbi, and reads the data from the second recording layer Lbi.

FIG. 3 is a schematic diagram showing an example of arrangement of a plurality of servo areas SV and a plurality of data areas DTR on the single disk DK according to the first embodiment. As shown in FIG. 3, a direction toward the outer circumference of the disk DK in the radial direction d1 of the disk DK is referred to as an outward direction (outside), and a direction opposite to the outward direction is referred to as an inward direction (inside).

In FIG. 3, the user data area U is divided into an inner circumferential area IR located in the inward direction, an outer circumferential area OR located in the outward direction, and an intermediate circumferential area MR located between the inner circumferential area IR and the outer circumferential area OR.

The disk DK includes a plurality of servo areas SV and a plurality of data areas DTR. For example, the plurality of servo areas SV may extend radially in the radial direction of the disk DK and may be discretely arranged at predetermined intervals in the circumferential direction. For example, the plurality of servo areas SV may extend linearly from the inner circumference to the outer circumference and may be discretely arranged at predetermined intervals in the circumferential direction. For example, the plurality of servo areas SV may extend in a spiral shape from the inner circumference to the outer circumference and may be discretely arranged at predetermined intervals in the circumferential direction. Alternatively, for example, the plurality of servo areas SV may be arranged in a form of islands in the radial direction and may be discretely arranged at different predetermined intervals in the circumferential direction.

In the following descriptions, one servo area SV in a predetermined track may also be referred to as a "servo sector". Incidentally, the "servo area SV" may also be referred to as a "servo sector SV". The servo sector includes servo data. The "arrangement and the like of several servo data elements constituting the servo sector" may be hereinafter referred to as a "servo pattern". Incidentally, the "servo data written to the servo sector" may also be referred to as a "servo sector".

Each of a plurality of data areas DTR is arranged between a plurality of servo areas SV. For example, the data area DTR corresponds to the area between two continuous servo areas SV in the circumferential direction. One data area DTR on a predetermined track may also be hereinafter referred to as the "data sector". Incidentally, the "data area DTR" may also be referred to as a "data sector DTR". The data sector includes user data. Incidentally, the "user data written to the data sector" may also be referred to as the "data sector". The "data sector" may also be referred to as the "user data". In addition, "a pattern composed of several data elements" may also be referred to as a "data pattern". In the example shown in FIG. 3, the data pattern on a predetermined track is composed of a plurality of servo data elements (servo sectors) and a plurality of user data elements (data sectors).

The servo area SV includes a plurality of zone servo areas ZSV and the like. Incidentally, in addition to the zone servo areas ZSV, the servo area SV may include an area including a gap (i.e., displacement of circumferential positions of two zone servo areas), an area including the servo data, the data area DTR, and the like. The plurality of zone servo areas ZSV are discretely arranged in the radial direction d1. Each of the plurality of zone servo areas ZSV extends in the radial direction d1.

One zone servo area (servo area) ZSV in a predetermined track may also be referred to as a "zone servo sector" or a "servo sector". Incidentally, the "zone servo area (servo area) ZSV" may also be referred to as a "zone servo sector ZSV" or a "servo sector ZSV". The "servo data written in the zone servo sector" may also be referred to as a "zone servo sector" or a "servo sector". The "arrangement of several servo data elements constituting the zone servo sector" may also be referred to as a "zone servo pattern" or a "servo pattern". One servo area SV in a predetermined track may also be hereinafter referred to as a "zone pattern sector".

Incidentally, the "servo area SV" may also be referred to as the "zone pattern sector". The "at least one data element and the like written to the zone pattern sector" may also be referred to as the "zone pattern sector". The zone pattern sector includes at least one zone servo sector. The "data pattern of the zone pattern sector" may also be hereinafter referred to as a "zone data pattern".

In the example shown in FIG. 3, the servo areas SV include zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may also be arranged in a staircase pattern in the radial direction.

The zone servo area ZSV2 is located on an inner circumferential side than the zone servo area ZSV1. The zone servo area ZSV0 is located on an outer circumferential side than the zone servo area ZSV1. For example, the zone servo area ZSV2 is arranged from the inner circumferential area IR to the middle circumferential area MR, the zone servo area ZSV1 is arranged from the inner circumferential area IR to the outer circumferential area OR, and the zone servo area ZSV0 is arranged from the middle circumferential area MR to the outer circumferential area OR. In the following descriptions, a predetermined radial area in which the plurality of zone servo areas ZSV are arranged in the circumferential direction, in a predetermined servo area SV, may also be referred to as a zone servo boundary area, a double servo area, or a double zone servo area ZB.

In the example shown in FIG. 3, the main servo areas SVO and the sub-servo areas SVE are alternately arranged at intervals in the circumferential direction. For example, one sub-servo area SVE is arranged between two main servo areas SVO that are continuously aligned at an interval in the circumferential direction. In other words, one sub-servo area SVE is arranged between two main servo areas SVO that are continuously aligned at an interval in the circumferential direction. For example, when sequentially continuous numbers are assigned to all the servo areas SV of the disk DK, the main servo areas SVO correspond to the odd-numbered servo areas SV, and the sub-servo areas SVE correspond to the even-numbered servo areas SV. Incidentally, two or more sub-servo areas SVE may be arranged between two main servo areas SVO that are continuously arranged at an interval, in the circumferential direction.

The main servo areas SVO and the sub-servo areas SVE may be composed of, for example, only servo areas that read and demodulate the servo data as a whole (hereinafter often referred to as normal servo areas). In the following descriptions, "reading and demodulating the servo data" may also be referred to as "servo-reading". The main servo areas SVO and the sub-servo areas SVE may also be composed of, for example, the normal servo areas, and servo areas (hereinafter often referred to as short servo areas) where servo-reading is performed in a smaller circumferential range of the servo data than a circumferential range of the servo data where servo-reading is performed in the normal servo areas.

A media cache M is allocated to the disk DK. However, the media cache M may not be arranged on the disk DK.

By using the plurality of servo data elements described above with the read head RHD, for example, the positioning error of the head HD (for example, the write head WHD) can be derived.

In the first embodiment, the example in which the number of zones of the disk DK is three has been described, but the number of zones of the disk DK can be variously changed. The number of zones of the disk DK may be thirty to forty. In addition, each of the zones includes a plurality of bands. For example, each of the zones includes several hundreds of bands.

FIG. 4 is a schematic diagram showing three tracks STR where shingled magnetic recording of the user data area U of the disk shown in FIG. 3 is performed, and the write head WHD. The user data area U includes a shingled magnetic recording area. Sequentially writing the data in band units within the user data area U is permitted, i.e., shingled magnetic recording is permitted.

As shown in FIG. 4, the write head WHD can sequentially write the data to the disk DK in the traveling direction d2. The read head RHD shown in FIG. 3 can also sequentially read the data written to the disk DK in the traveling direction d2.

In the direction parallel to the radial direction d1, the direction of sequentially executing the shingled magnetic recording for a plurality of tracks STR that are a plurality of data tracks, i.e. the direction of making a track STR to which the data is be next written overlap with a track STR to which the data has been previously written, in the radial direction d1, is referred to as an overwrite direction or a recording progress direction. In a band BAe shown in FIG. 4, an overwrite direction d5 is an inward direction, but the overwrite direction may be an outward direction.

For example, the overwrite direction applied to a plurality of bands BA (a plurality of zones Z) located on an outer circumference side relative to a specific radial position and an overwrite direction applied to a plurality of bands BA (a plurality of zones Z) located on an inner circumferential side relative to the specific radial position may be opposite to each other.

The band BAe includes a plurality of tracks STR including tracks STRe, STRe+1, and STRe+2. The data is continuously overwritten to the tracks STRe, STRe+1, and STRe+2 in the overwrite direction d5 in the order of these tracks. The track STRe among the tracks STRe, STRe+1, and STRe+2 corresponds to the track where data is first written, and the track STRe+2 corresponds to the track where data is last written.

The track STRe has a track center STCe in the center of the radial direction d1 when data is not overwritten to the other track. The track STRe+1 has a track center STCe+1 in the center of the radial direction d1 when data is not overwritten to the other track. The track STRe+2 has a track center STCe+2 in the center of the radial direction d1 when data is not overwritten to the other track.

In the example shown in FIG. 4, the data is written to the tracks STRe, STRe+1, and STRe+2 at a pitch (shingled magnetic recording track pitch) STP. The track center STCe of the track STRe and the track center STCe+1 of the track STRe+1 are separated from each other at the pitch STP in the radial direction d1. The track center STCe+1 of the track STRe+1 and the track center STCe+2 of the track STRe+2 are separated from each other at the pitch STP in the radial direction d1. The data may be written to the tracks STRe to STRe+2 at different pitches.

A width in the radial direction d1 of the area where data is not overwritten to the track STRe+1, of the track STRe, is the same as a width in the radial direction d1 of the area where data is not overwritten to the track STRe+2, of the track STRe+1. Incidentally, the width in the radial direction d1 of the area where data is not overwritten to the track STRe+1, of the track STRe, may be different from the width in the radial direction d1 of the area where data is not overwritten to the track STRe+2, of the track STRe+1. The n-th sector SCen of the track STRe, the n-th sector SC(e+1)n of the track STRe+1, and the n-th sector SC(e+2)n of the track STRe+2 are adjacent to each other in the radial direction d1.

In FIG. 4, each track STR has a rectangular shape for convenience of descriptions. In reality, however, each track STR is curved along the circumferential direction. In addition, each track STR may have a wave shape extending in the circumferential direction while varying in the radial direction d1. Incidentally, data is overwritten to three tracks STR in FIG. 4, but data may be overwritten to two tracks STR or more than three tracks STR.

The write processing unit 62 can select the shingled magnetic recording of overwriting the data to the plurality of tracks STR in the overwrite direction d5 and urge the write head WHD to write the data to each of the bands BA. In the example shown in FIG. 4, the write processing unit 62 sequentially executes the shingled magnetic recording for the tracks STRe to STRe+2 in the band BAe at the pitch STP in the inward direction (overwrite direction d5). Since the user data area U is the area where the data is written in the shingled magnetic recording, the recording density of the user data area U can be improved.

The write processing unit 62 writes the data to the track STRe+1 at the pitch STP in the inward direction of the track STRe and overwrites data to the track STRe+1 and an inner circumferential part of the track STRe. The write processing unit 62 writes the data to the track STRe+2 at the pitch STP in the inward direction of the track STRe+1 and overwrites data to the track STRe+2 and an inner circumferential part of the track STRe+1.

Figure 5:
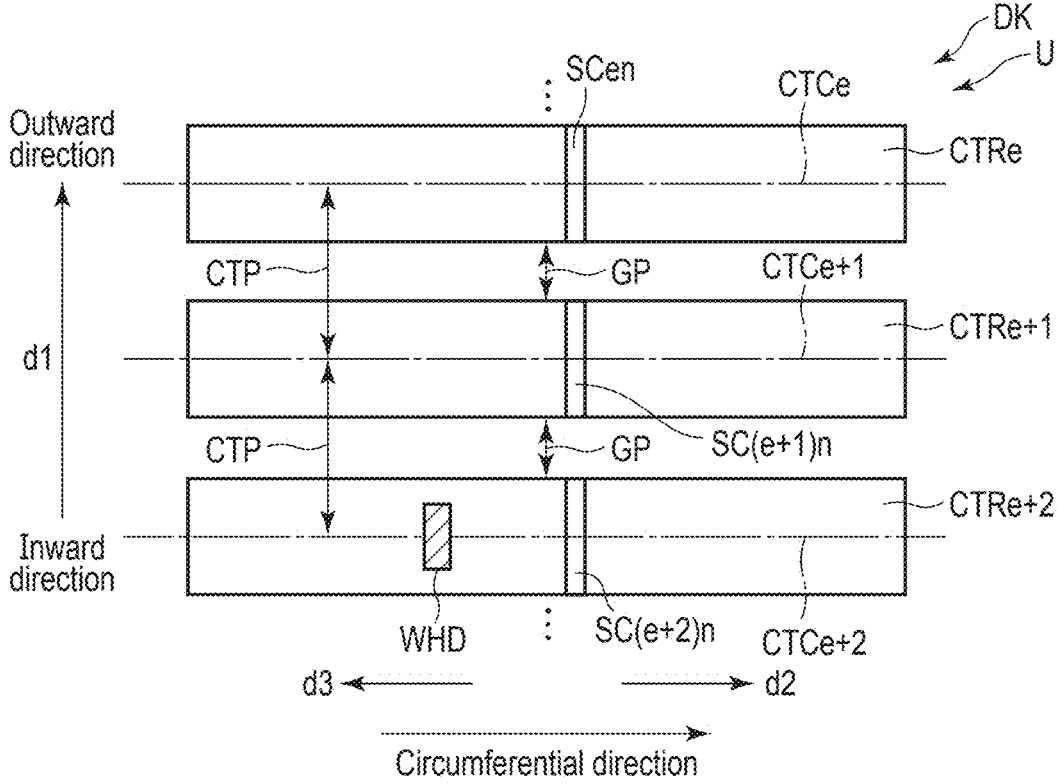
FIG. 5 is a schematic diagram showing three tracks where conventional magnetic recording of the user data area of the disk shown in FIG. 3 is performed, and the write head.

FIG. 5 is a schematic diagram showing three tracks CTR where conventional magnetic recording for the user data area U of the disk DK shown in FIG. 3 is performed, and the write head WHD. The user data area U includes a conventional magnetic recording area. In the user data area U, writing the data in a random manner is permitted, i.e., conventional magnetic recording is permitted.

As shown in FIG. 5, the user data area U includes a plurality of tracks CTR including tracks CTRe, CTRe+1, and CTRe+2. Each of the plurality of tracks CTR is a data track. For example, widths (track widths) in the radial direction d1 of the tracks CTRe, CTRe+1, and CTRe+2 are the same as each other. Incidentally, the track widths of the tracks CTRe to CTRe+2 may be different from each other.

The track CTRe has a track center CTCe in the center of the radial direction d1, the track CTRe+1 has a track center CTCe+1 in the center of the radial direction d1, and the track CTRe+2 has a track center CTCe+2 in the center of the radial direction d1. In the example shown in FIG. 5, the data is written to the tracks CTRe, CTRe+1, and CTRe+2 at the pitch (conventional magnetic recording track pitch) CTP. The track center CTCe of the track CTRe and the track center CTCe+1 of the track CTRe+1 are separated from each other at the pitch CTP. The track center CTCe+1 of the track CTRe+1 and the track center CTCe+2 of the track CTRe+2 are separated from each other at the pitch CTP.

The track CTRe and the track CTRe+1 are separated from each other at a gap GP. The track CTRe+1 and the track CTRe+2 are separated from each other at the gap GP. Incidentally, the data may be written to the tracks CTRe to CTRe+2 at different pitches. The n-th sector SCen of the track CTRe, the n-th sector SC(e+1)n of the track CTRe+1, and the n-th sector SC(e+2)n of the track CTRe+2 are adjacent to each other in the radial direction d1. In FIG. 5, each track CTR has a rectangular shape for convenience of descriptions. In reality, however, each track CTR is curved along the circumferential direction. In addition, each track CTR may have a wave shape extending in the circumferential direction while varying in the radial direction d1.

The write processing unit 62 can execute the write processing by selecting the conventional magnetic recording of writing the data to the plurality of tracks CTR spaced apart in the radial direction d1 of the disk DK. In the example shown in FIG. 5, the write processing unit 62 positions the write head WHD to the track center CTCe in a predetermined area of the disk DK and executes the conventional magnetic recording for the track CTRe or a predetermined sector of the track CTRe.

The write processing unit 62 positions the write head WHD to the track center CTCe+1, which is separated from the track center CTCe of the track CTRe in the inward direction at the pitch CTP, and executes the conventional magnetic recording for the track CTRe+1 or a predetermined sector of the track CTRe+1. The write processing unit 62 positions the write head WHD to the track center CTCe+2, which is separated from the track center CTCe+1 of the track CTRe+1 in the inner direction at the pitch CTP, and executes the conventional magnetic recording for the track CTRe+2 or a predetermined sector of the track CTRe+2.

The write processing unit 62 may sequentially execute the conventional magnetic recording for the tracks CTRe, CTRe+1, and CTRe+2, in a predetermined area of the disk DK, or randomly execute the conventional magnetic recording for a predetermined sector of the track CTRe, a predetermined sector of the track CTRe+1, and a predetermined sector of the track CTRe+2.

Figure 6:
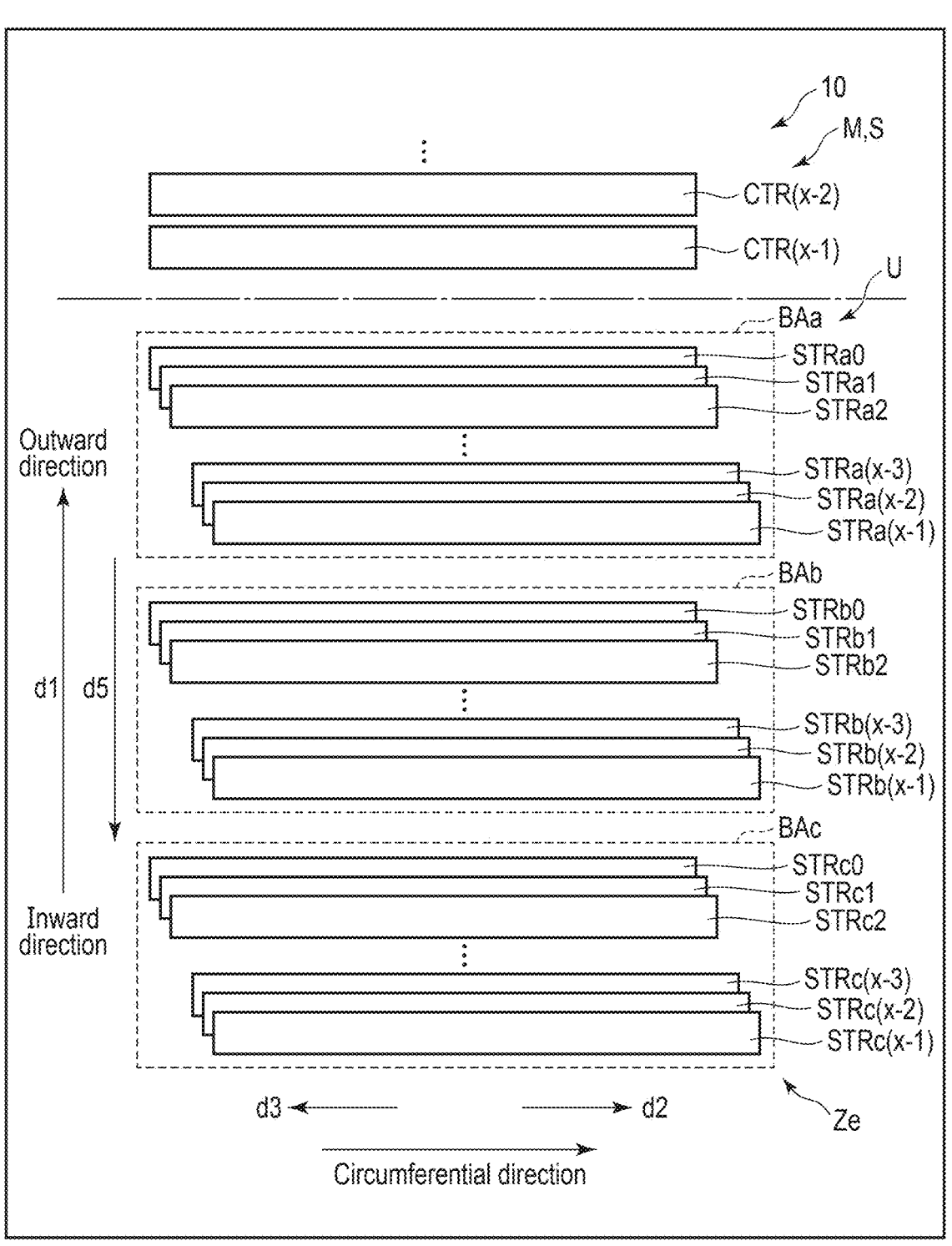
FIG. 6 is a schematic diagram showing an example of data write processing on the disk.

FIG. 6 is a schematic diagram showing an example of the data write processing on the disk DK. Each of the tracks STR and CTR is a data track. As shown in FIG. 6, the user data area U includes bands BAa, BAb, and BAc. The bands BAa, BAb, and BAc belong to the same zone Ze. In the zone Ze, the bands BAa, BAb, and BAc are intermittently arranged in the overwrite direction in the order of these bands.

The bands BAa and BAb are adjacent to each other in the radial direction d1, and the bands BAb and BAc are adjacent to each other in the radial direction d1.

The band BAa includes x tracks such as tracks STRa0, STRa1, STRa2, . . . , STRa(x−3), STRa(x−2), and STRa(x−1). The tracks STRa0 to STRa(x−1) are subjected to the shingled magnetic recording in the overwrite direction d5 in the order of these tracks. In the band BAa, the track STRa0 corresponds to a first track where the data is first written, and the track STRa(x−1) corresponds to the last track where data is last written.

The band BAb includes x tracks such as tracks STRb0, STRb1, STRb2, . . . , STRb(x−3), STRb(x−2), and STRb (x−1). The tracks STRb0 to STRb(x−1) are subjected to the shingled magnetic recording in the overwrite direction d5 in the order of these tracks. In the band BAb, the track STRb0 corresponds to a first track where the data is first written, and the track STRb(x–1) corresponds to the last track where the data is last written.

The band BAc includes x tracks STRc0, STRc1, STRc2, . . . , STRc(x–3), STRc(x–2), and STRc(x–1). The tracks STRc0 to STRc(x–1) are subjected to the shingled magnetic recording in the overwrite direction d5 in the order of these tracks. In the band BAc, the track STRc0 corresponds to a first track where the data is first written, and the track STRc(x–1) corresponds to the last track where the data is last written.

The number of the tracks STR included in each of the bands BA belonging to the same zone Z is the same. For example, the number of the tracks STR included in each of the bands BA belonging to the zone Ze is the same. In other words, the number of the tracks STR included in the band BA is fixed for each zone Z. In this example, the number of tracks STR included in each of the bands BA belonging to the zone Ze is x.

FIG. 6 shows tracks CTR(x–2) and CTR(x–1). In FIG. 6, the tracks CTR(x–2) and CTR(x–1) are subjected to the conventional magnetic recording in the media cache M or the system area S. The tracks CTR(x–2) and CTR(x–1) are adjacent to each other in the radial direction d1.

FIG. 7 is a schematic diagram showing two bands BAa and BAb and one guard band GB of the user data area U shown in FIG. 6. As shown in FIG. 7, in the shingled magnetic recording, unlike the conventional magnetic recording, the MPU 60 manages track groups of the shingled magnetic recording area of the user data area U in units referred to as bands, with the feature of overwriting the data to a part of the track STR.

A guard band GB is generally provided between adjacent bands BA in the radial direction d1. The guard band GB includes a guard track GTR. Unlike the first embodiment, the guard band GB may include a plurality of guard tracks GTR. The guard band GB has a role of suppressing the interference between the adjacent bands BA. The shingled magnetic recording can be performed in a unit of one band BA by the guard band GB. In addition, the ranges (bands BA) where the data is sequentially written can be separated by the guard band GB.

For example, the track center STCa(x–3) of the track STRa(x–3), the track center STCa(x–2) of the track STRa(x–2), the track center STCa(x–1) of the track STRa(x–1), the track center GTC of the guard track GTR, the track center STCb0 of the track STRb0, the track center STCb1 of the track STRb1, and the track center STCb2 of the track STRb2, are located at equal pitch in the overwrite direction d5.

The recording capacity of each band BA in the user data area U, except for the guard band GB, is generally predetermined based on the specifications required by the user. The MPU 60 can record the same capacity of data in each of the bands BA. In general, the recording capacity of each band BA is 128 MiB or 256 MiB.

FIG. 8 is a schematic diagram showing three sectors SCe, SC(e+1), and SC(e+2) of one track STRa0 of the band BAa shown in FIG. 6. As shown in FIG. 8, each of the tracks STR includes a plurality of sectors SC. The track STRa1 includes a plurality of sectors SC including sectors SCe, SC(e+1), and SC(e+2). The number of the sectors SC included in each of the tracks STR belonging to the same zone Z is the same.

Each of the sectors SC has a length Ls in the circumferential direction of the disk DK. Each sector SC may be a split sector that is divided by the servo sector SV. In this case, the length of the sector SC does not need to be Ls.

The write head WHD is a magnetic head for energy-assisted recording that performs energy-assisted magnetic recording (EAMR). In the first embodiment, the write head WHD is configured to use energy other than the magnetic energy, but is not limited to this. The write head WHD may also be a magnetic head that is not configured to perform the energy-assisted recording.

Figure 9:
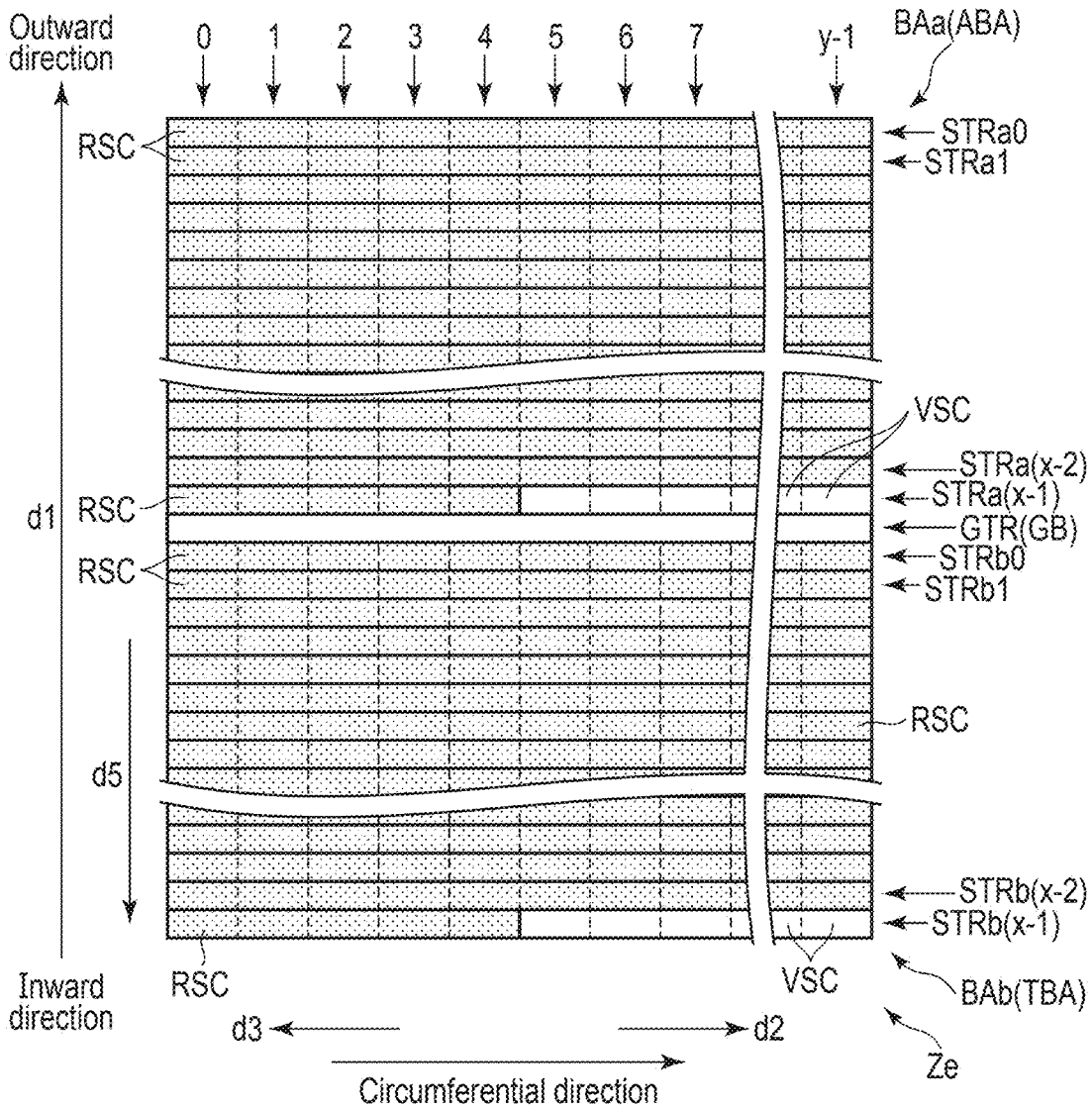
FIG. 9 is a schematic diagram showing two bands and one guard band shown in FIG. 7, illustrating a plurality of target sectors and a plurality of unused sectors.

FIG. 9 is a schematic diagram showing the two bands BAa and BAb and one guard band GB shown in FIG. 7, illustrating targets where the user data is to be written, i.e., the plurality of target sectors RSC and the plurality of unused sectors VSC.

In FIG. 9, each of the tracks STR has a rectangular shape for convenience of description. In reality, however, each track STR is curved along the circumferential direction. In addition, a plurality of tracks STR are not made to overlap but are arranged in the overwrite direction d5. In reality, however, the plurality of tracks STR are arranged in the overwrite direction d5 while overlapping. In the figure, the target sector RSC is marked with a dot pattern. The unused sectors VSC are represented by a solid color.

As shown in FIG. 9, the band number of the band BAa is "a" and the band number of the band BAb is "b". The track number of each band BA is "0" to "x–1". The sector number of each track STR is "0" to "y–1". In the following descriptions, the sector SC of each band BA may be identified by the following code "SC (track number, sector number)".

In the first embodiment, the band BAa is a band adjacent to the band BAb, and is a band located above the band BAb in the overwrite direction d5.

Each of the tracks STR of the band BAa includes G target sectors RSC (one or more target sectors RSC) to which valid data is written. For example, the track STRa0 includes y target sectors RSC (G=y). All the sectors SC of the track STRa0 are the target sectors RSC. The track STRa(x–1) includes five target sectors RSC (G=5). The remaining sectors SC of the track STRa(x–1) are unused sectors VSC where valid data is not written.

Based on the above, the number of target sectors RSC in the track STRa0 is different from the number of target sectors RSC in the track STRa(x–1).

In each of the bands BA of the zone Ze, all sectors SC of x–1 tracks STR from number 0 to number x–2 are the target sectors RSC to which valid data is written. In the x–1-th track STR of each band BA of the zone Ze, five sectors SC from number 0 to number 4 are the target sectors RSC. In contrast, in the x–1-th track STR, remaining sectors SC from number 5 to number y–1 are the unused sectors VSC where valid data is not written.

FIG. 10A is a schematic diagram showing an example of the first track STR0 and the second track STR1 of the magnetic disk device 1, illustrating a state in which the target sectors RSCe, RSC(e+1), and RSC(e+2) of the first track STR0 become corrupted target sectors CSC1, CSC2, and CSC3 since the write head WHD exceeds an initial first assurance position IGPm during the write processing for the second track STR1, and showing as a graph a change in the bit error rate (BER) for the first track STR0. In addition, in FIG. 10A as well, the first track STR0 and the like are drawn such that the circumferential direction is assumed to be a linear direction, for convenience of descriptions. In the descriptions made with reference to FIG. 10A, it is assumed that the magnetic disk device 1 does not comprise the adjustment unit 64 shown in FIG. 1.

As shown in FIG. 10A, each of the first track STR0 and the second track STR1 is the data track, and all the sectors SC of the first track STR0 and all the sectors (data sectors)

SC of the second track STR1 are the target sectors RSC. The first track STR0 is located in the first direction da that is parallel to the radial direction d1 with respect to the second track STR1.

The write processing for the first track STR0 is executed ideally in a state in which a positioning error PE is extremely small (PE≈0 or PE=0). For example, if PE=0 during the write processing for the first track STR0, the data is written to the first track STR0 in a state in which the write head WHD is continuously located on the target position, i.e., the track center STC0 of the first track STR0.

If the magnetic disk device 1 is affected by external vibration or the like during the write processing, a positioning error PE occurs when positioning the write head WHD. The positioning error PE is an amount of displacement from the target position of the write head WHD in the radial direction d1. By setting a track margin, the allowable range in which it is assured that data on the adjacent tracks is readable can be determined. The position which is separated from the track center STC1 of the second track STR1 (i.e., the target position of the write head WHD during the write processing for the second track STR1) by current first track margin CTMm (absolute value of the current first track margin CTMm) in the first direction da is current first assurance position CGPm.

The current first track margin CTMm is an initial first track margin, i.e., initial first track margin ITMm and, in this case, the current first assurance position CGPm is an initial first assurance position, i.e., initial first assurance position IGPm.

For example, if the write processing is executed for the second track STR1 in a state in which the write head WHD is oscillating in the radial direction d1, there is a risk that the position of the write head WHD (positioning error PE) may exceed the current first assurance position CGPm in the first direction da. If the target sectors RSCe, RSC(e+1), and RSC(e+2) of the first track STR0 are adjacent to the write head WHD in the radial direction d1 during the period when the position of the write head WHD exceeds the current first assurance position CGPm in the first direction da, it is determined (predicted) that the data in the target sectors RSCe, RSC(e+1), and RSC(e+2) of the first track STR0 are corrupted.

BER of the data is desirably low, but the BER of the data of the target sectors RSCe, RSC(e+1), and RSC(e+2) of the first track STR0 exceeds a threshold value BERTH. As understood from the graph of FIG. 10, as the positioning error PE becomes greater, the adverse effect of adjacent track interference (ATI) becomes greater and the BER of the data in the first track STR0, which is adversely affected by ATI, becomes excessively high.

For this reason, the target sectors RSCe, RSC(e+1), and RSC(e+2) among the plurality of target sectors RSC of the first track STR0 are determined to be the corrupted target sectors CSC1, CSC2, and CSC3, respectively. This matter may lead to a situation that the quality of the signals obtained by reading the data in the corrupted target sectors CSC1, CSC2, and CSC3 may be deteriorated or the data in the corrupted target sectors CSC1, CSC2, and CSC3 may be erased.

In the example described with reference to FIG. 10A, the magnetic disk device 1 does not comprise a function of executing error correction in track units for the data in the track TR or is invalidated. In this case, the error correction in track units is also referred to as error correction in units of tracks, track error correction code (ECC), or the like. For this reason, the target sectors RSCe, RSC(e+1), and RSC(e+2) remain the corrupted target sectors CSC1, CSC2, and CSC3, respectively.

Therefore, by setting a track interval (pitch STP) having a sufficient margin by considering the maximum oscillation amount of the write head WHD, it is possible to deal with the risk that the corrupted target sectors CSC may occur. More specifically, by ensuring a track margin equivalent to the maximum amount of positioning error PE and setting the pitch STP, the user data of the first track STR0 can be secured.

In FIG. 10A, it has been described that all the target sectors RSC of the second track STR1 have a common initial first track margin ITMm. In FIG. 10B and FIG. 10C to be described later, all the target sectors RSC of the second track STR1 also have the common initial first track margin ITMm. However, setting the above-described current first track margin CTMm is an example, and the track margin TM may be made different in units of the target sectors RSC.

In addition, in FIG. 10A, the relationship in position between the current first track margin CTMm on the first direction da side from the track center STC1 and the positioning error PE has been focused. Although the descriptions are omitted here, when performing the write processing for the second track STR1, the relationship in position between the track margin on the second direction db side from the track center STC1 and the positioning error PE has also been focused. Incidentally, the second direction db is opposite to the first direction da.

FIG. 10B is a schematic diagram showing an example of the first track STR0 and the second track STR1 of the magnetic disk device 1, illustrating a state in which the target sector of the first track STR0 does not become a corrupted target sector since the write processing is suspended when the write head WHD exceeds an initial first write suspending position ISPm during the write processing for the second track STR1, and showing as a graph the variation in BER for the first track STR0. In addition, in FIG. 10B as well, the first track STR0 and the like are drawn such that the circumferential direction is assumed to be a linear direction, for convenience of descriptions. In the descriptions made with reference to FIG. 10B, it is assumed that the magnetic disk device 1 does not comprise the adjustment unit 64 shown in FIG. 1.

As shown in FIG. 10B, each of the first track STR0 and the second track STR1 is the data track, and all the sectors SC of the first track STR0 and all the sectors (data sectors) SC of the second track STR1 are the target sectors RSC. The write processing for the first track STR0 is executed ideally in a state in which the positioning error PE is extremely small (PE≈0 or PE=0).

In order to prevent or suppress the write processing in a state in which the positioning error PE becomes negative with reference to the current first track margin CTMm, the magnetic disk device 1 sets a current first write-off track slice CWOSm. The position which is separated from the track center STC1 of the second track STR1 (i.e., the target position of the write head WHD when performing the write processing for the second track STR1) by the current first write-off track slice CWOSm (absolute value of the current first write-off track slice CWOSm) in the first direction da is the current first write suspending position CSPm. The current first write off-track slice CWOSm is an initial first write off-track slice, i.e., an initial first write off-track slice IWOSm and, in this case, the current first write suspending position CSPm is an initial first write suspending position, i.e., the initial first write suspending position ISPm.

When performing the write processing for the second track STR1, the track center STC1 is set to 0 (zero), the first direction da side from the track center STC1 is set to be negative, and the second direction db side from the track center STC1 is set to be positive. During the period when the data is being written to the second track STR1, when the determination unit 65 determines that the position of the write head WHD exceeds the first write suspending position CSPm in the first direction da (i.e., the positioning error PE is negative with respect to the current first write off-track slice CWOSm), the write processing unit 62 can suspend writing the data to the second track STR1. In the second track STR1, an area surrounded by a solid line is the area where the data is written, and an area surrounded by a dashed line is the area in a case where it is assumed that writing is not suspended and the data is written.

The remaining target sectors RSC for which writing the data is postponed, among the plurality of target sectors RSC of the second track STR1, become empty sectors where no data is written. By avoiding the situation that the position of the write head WHD may exceed the current first assurance position CGPm in the first direction da, the occurrence of the corrupted target sectors CSC in the first track STR0 can be prevented.

Incidentally, the track STR has a servo sector in addition to the sector SC which is the data sector. In the track STR, data sectors and servo sectors are generally provided alternately. The read head RHD can derive the positioning error PE together with the servo sector. Therefore, the positioning error PE is generally the information which can be obtained intermittently.

In order for the positioning error PE not to be negative relative to the current first track margin CTMm, i.e., to prevent PE<CTMm, the current first write-off track slice CWOSm needs to be greater than or equal to the current first track margin CTMm, i.e., CTMm≤CWOSm. In order to avoid the situation in which PE<CTMm, the current first write-off track slice CWOSm is desirably set such that CWOSm>CTMm. Accordingly, the write processing for the second track STR1 can be suspended before the position of the write head WHD exceeds the current first write suspending position CSPm in the first direction da, and the situation that the data quality of the first track STR0 may be deteriorated can be avoided.

However, it needs to be noted that the write processing can be suspended more easily as the absolute value of the current first write-off track slice CWOSm is smaller, which leads to a decrease in the write performance of the magnetic disk device 1. Incidentally, if the write processing for the second track STR1 is suspended, in the magnetic disk device 1 which does not comprise the function of executing the error correction in track units or in which the function is invalidated, write retry processing of resuming the write processing for the second track STR1 after awaiting the rotation of the disk DK until PE≥CWOSm, is executed. Since the data can be written to the target sector RSC where the data of the second track STR1 is not written, in the write retry processing, the situation that the efficiency of use of the second track STR1 may remain low is avoided.

In FIG. 10B, the relationship in position among the current first track margin CTMm on the first direction da side from the track center STC1, the current first write-off track slice CWOSm, and the positioning error PE has been focused. Although the descriptions are omitted here, when performing the write processing for the second track STR1, the relationship in position between the track margin and the write off-track slice on the second direction db side from the track center STC1 and the positioning error PE is also focused.

FIG. 10C is a schematic diagram showing an example of the first track STR0 and the second track STR1 of the magnetic disk device 1, illustrating a state in which the target sector RSCe of the first track STR0 becomes a corrupted target sector CSC1 even if the write processing is suspended when the write head WHD exceeds the initial first write suspending position ISPm during the write retry processing for the second track STR1, and showing as a graph the variation in BER for the first track STR0. In addition, in FIG. 10C as well, the first track STR0 and the like are drawn such that the circumferential direction is assumed to be a linear direction, for convenience of descriptions. In the descriptions made with reference to FIG. 10C, it is assumed that the magnetic disk device 1 does not comprise the adjustment unit 64 shown in FIG. 1.

After performing the operation to suspend the write processing for the second track STR1 in FIG. 10B, the write retry processing for the second track STR1 can be performed as shown in FIG. 10C after executing the rotation wait of the disk DK. In the figure, an area where the data is written by the write processing in FIG. 10B for the second track STR1 is surrounded by a dashed line, and a range where the data is written in the write retry processing in FIG. 10C for the second track STR1 is surrounded by a solid line. A range in which the data is further written to the second track STR1 in a case where it is assumed that writing is not suspended during the write retry processing, is surrounded by a dashed line. In this example, the data is written to the second track STR1 in a state in which the write head WHD oscillates in a substantially similar manner in both the above-described write processing and the above-described write retry processing.

During the period when write retry of the data to the second track STR1 is executed, when the determination unit 65 determines that the position of the write head WHD exceeds the first write suspending position CSPm in the first direction da, the write processing unit 62 can suspend writing the data to the second track STR1.

In this case as well, the remaining target sectors RSC for which writing the data is postponed, among the plurality of target sectors RSC of the second track STR1, become empty sectors where no data is written. The situation that the position of the write head WHD may exceed the current first assurance position CGPm in the first direction da can be avoided. Although the descriptions are omitted with reference to FIG. 10C as well, when performing the write processing for the second track STR1, the relationship in position between the track margin and the write off-track slice on the second direction db side from the track center STC1 and the positioning error PE is also focused.

By the way, since the position of the write head WHD exceeds the current first write suspending position CSPm in the first direction da, but does not exceed the current first assurance position CGPm in the first direction da, it seems that the user data in the first track STR0 can be secured. However, as the write processing for the same target sector RSC is repeated, the corrupted target sector CSC can easily occur in the first track STR0 due to the spread of the magnetization inversion probability referred to as fringe, which is a type of ATI. In FIG. 10C as well, the target sector RSCe of the first track STR0 becomes a corrupted target sector CSC1. In FIG. 10C, a range of occurrence of fringe noise is marked with a grating pattern.

In summary, if data is written to the same target sector RSC of the second track STR1 a plurality of times, a corrupted target sector CSC may occur in the first track STR0 even if the write head WHD does not exceed the current first assurance position CGPm each time.

Therefore, in the present application, the magnetic disk device 1 comprises the adjustment unit 64, and the adjustment unit 64 can adjust the current first assurance position CGPm (current first track margin CTMm) and the current first write suspending position CSPm (current first write-off track slice CWOSm), based on the information on the positioning error PE during the write processing.

Even if the data is continuously written to the same target sector RSC, the situation that the quality of data in the sectors adjacent to the radial direction d1 may be damaged can be avoided. Therefore, the magnetic disk device 1 which can secure the data on the disk DK can be obtained. In addition, since the adjustment executed by the adjustment unit 64 is not an adjustment which excessively tightens the current first assurance position CGPm (current first track margin CTMm) and the current first write suspending position CSPm (current first write off-track slice CWOSm), the decline in the write performance of the magnetic disk device 1 can be suppressed.

Next, the operations of the MPU 60 and the like at the time of writing the data onto the disk DK will be described. Writing the data to the first track STR0 and then writing the data to the second track STR1 which is adjacent to the first track STR0 will be focused here.

As shown in FIG. 1, FIG. 2, and FIG. 10B, the write processing unit 62 can execute the write processing of writing the data to the recording layer L. The write processing unit 62 can set the target position of the write head WHD in the radial direction d1 to the reference radius position when writing the data to the n-th target sector RSC1$n$ of the second track STR1. The reference radius position is the track center STC1 of the second track STR1.

The adjustment unit 64 can adjust the current first assurance position CGPm which is located in the first direction da from the reference radius position (track center STC1), and the current first write suspending position CSPm which is located between the reference radius position and the current first assurance position CGPm. The current first assurance position CGPm is the limit position of the write head WHD where it is assured that the data of the n-th target sector RSC0$n$ of the first track STR0 can be read. The current first write suspending position CSPm is the limit position of the write head WHD in the first direction da where writing the data to the n-th target sector RSC1$n$ of the second track STR1 can be permitted.

When the determination unit 65 determines that the data has been written to the target sector RSC1$n$, the adjustment unit 64 can tighten each of the current first assurance position CGPm and the current first write suspending position CSPm. In other words, the adjustment unit 64 can update the current first assurance position CGPm and the current first write suspending position CSPm to a position shifted towards the reference radius position (track center STC1) side. In other words, the adjustment unit 64 can update the current first track margin CTMm and the current first write-off track slice CWOSm to more stringent values, and can update the current first track margin CTMm and the current first write-off track slice CWOSm to negative values closer to 0 (zero).

The adjustment unit 64 can tighten the current first track margin CTMm and the current first write-off track slice CWOSm by the amount by which it is predicted that the range of occurrence of the fringe noise has expanded due to the data being written to the target sector RSC1$n$. As a result, the magnetic disk device 1 can avoid the situation that the quality of the data in the target sector RSC0$n$ may be deteriorated no matter how many times the data is written to the target sector RSC1$n$.

When the determination unit 65 further determines that the position of the write head WHD exceeds the current first write suspending position CSPm in the first direction da, the write processing unit 62 can suspend the write processing. For example, since the schedule for the write processing can be changed and writing the data to the n+1-th target sector of the second track STR1 can be suspended, the situation that the quality of the data in the n+1-th target sector of the first track STR0 may be deteriorated can be avoided.

In the above example, the adjustment unit 64 updates the current first assurance position CGPm and the current first write suspending position CSPm each time the data is written to the target sector RSC1$n$. However, the adjustment unit 64 does not need to update the current first assurance position CGPm and the current first write suspending position CSPm unless the adjustment unit 64 detects that the positioning error PE becomes negative with respect to the current first write-off-track slice CWOSm.

When the determination unit 65 determines that the data has been written to the n-th target sector RSC1$n$ of the second track STR1 and that the position of the write head WHD has not exceeded the current first write suspending position CSPm in the first direction da, the adjustment unit 64 can tighten each of the current first assurance position CGPm and the current first write suspending position CSPm and update the positions to positions shifted to the reference radius position side.

In contrast, when the determination unit 65 determines that the data has been written to the n-th target sector RSC1$n$ of the second track STR1 and that the position of the write head WHD has exceeded the current first write suspending position CSPm in the first direction da, the adjustment unit 64 can maintain the current first assurance position CGPm and the current first write suspending position CSPm.

As described above, when the absolute value of the positioning error PE becomes larger than the absolute value of the current first write-off track slice CWOSm ($|PE|>|CWOSm|$), the current first assurance position CGPm and the current first write suspending position CSPm may be tightened. In this case as well, it is possible to contribute to securing the data of the n-th target sector RSC0$n$ of the first track STR0.

The above-described adjustment unit 64 can not only tighten the current first assurance position CGPm and the current first write suspending position CSPm, but also reset the positions to their initial states. The counter 66 can count the number of write count of the n-th target sector RSC0$n$ of the first track STR0 when written to the n-th target sector RSC1$n$ of the second track STR1, and update the total number of write count in the storage medium. Examples of the storage medium in which the above-mentioned total number of write count is recorded and updated include a volatile memory 70, a nonvolatile memory 90, a disk DK, and the like. The above-mentioned storage medium may be a storage medium other than the volatile memory 70, the non-volatile memory 90, and the disk DK.

Incidentally, if the power is cut off while the volatile memory 70 is used as the above-mentioned storage medium, the data recorded in the volatile memory 70 may be saved to a nonvolatile storage medium such as the nonvolatile memory 90.

When the determination unit 65 determines that the above-mentioned total number of write count exceeds the reference number of write count, the refresh processing unit 67 can read the target data of the n-th target sector RSC0$n$ of the first track STR0, rewrite the target data to the target sector RSC0$n$, and reset the above-mentioned total number of write count recorded in the storage medium.

The current first assurance position CGPm is either the initial first assurance position IGPm or an updated first assurance position tightened from the initial first assurance position IGPm. The current first write suspending position CSPm is either the initial first write suspending position ISPm or an updated first write suspending position tightened from the initial first write suspending position ISPm.

When the refresh processing unit 67 rewrites the target data to the n-th target sector RSC0$n$ of the first track STR0 and resets the total number of write count described above, the adjustment unit 64 can reset the current first assurance position CGPm to the initial first assurance position IGPm and reset the current first write suspending position CSPm to the initial first write suspending position ISPm. In other words, when the adverse effects of ATI on the target sector RSC0$n$ have disappeared, the adjustment unit 64 can return each of the current first assurance position CGPm and the current first write suspending position CSPm to their initial positions. The state in which the write performance is deteriorated can be therefore canceled.

The refresh processing unit 67 invokes the refresh operation based on the total number of write count. However, the refresh processing unit 67 may invoke the refresh operation, based on the other physical quantity instead of the above-mentioned total number of write count. Alternatively, the refresh processing unit 67 may invoke the refresh operation based on both the above-mentioned total number of write count and the other physical quantity.

When the determination unit 65 determines that the updated first write suspending position (current first write suspending position CSPm) is located on the reference radius position (track center STC1) side relative to the reference first write suspending position, the refresh processing unit 67 can rewrite the target data to the n-th target sector RSC0$n$ of the first track STR0 and reset the total number of the write count, and the adjustment unit 64 can reset the current first assurance position CGPm to the initial first assurance position IGPm and reset the current first write suspending position CSPm to the initial first write suspending position ISPm. The above-mentioned reference first write suspending position is located on the reference radius position (track center STC1) side relative to the initial first write suspending position ISPm.

Since the adjustment unit 64 can avoid the situation that the current first assurance position CGPm (updated first assurance position) and the current first write suspending position CSPm (updated first write suspending position) are excessively tightened, together with the refresh processing unit 67 and the like, the state in which the write performance is deteriorated can be eliminated.

Next, means and methods for calculating the current first write suspending position CSPm will be described.

The current first assurance position CGPm is either the initial first assurance position IGPm or an updated first assurance position tightened from the initial first assurance position IGPm. In the radial direction d1, a distance from the reference radius position (track center STC1) to the initial first assurance position IGPm is defined as an initial first assurance distance, a distance from the reference radius position to the updated first assurance position is defined as an updated first assurance distance, a distance from the reference radius position to the initial first write suspending position ISPm is defined as an initial first write suspending distance, and a distance from the reference radius position to the updated first write suspending position is defined as an updated first write suspending distance.

For example, the initial first assurance distance=initial first track margin ITMm, and the initial first write suspending distance=initial first write off-track slice IWOSm.

The adjustment unit 64 can calculate a residual ratio (updated first assurance distance/initial first assurance distance), which is a ratio of the updated first assurance distance to the initial first assurance distance, calculate the updated first write suspending distance by multiplying the residual ratio by the initial first write suspending distance (IWOSm), and can derive the updated first write suspending position.

Based on the above, if the distance from the reference radius position to the current first assurance position CGPm is reduced to 80% of the distance from the reference radius position to the initial first assurance position IGPm, in the radial direction d1, the distance from the reference radius position to the current first write suspending position CSPm can be reduced to 80% of the distance from the reference radius position to the initial first write suspending position ISPm.

Next, means and methods for updating the current first assurance position CGPm will be described.

The current write allowable count, which is the number of times of allowing writing the data to the n-th target sector RSC1$n$ of the second track STR1, is either the initial write allowable count or the updated write allowable count decreased from the initial write allowable count.

The adjustment unit 64 can calculate a consumed write count based on the distance (positioning error PE) from the reference radius position of the write head WHD at the time when the data is written to the n-th target sector RSC1$n$ of the second track STR1, and update the current write allowable count by subtracting the consumed write count from the current write allowable count. The adjustment unit 64 can then tighten the current first assurance position CGPm based on the updated current write allowable count, and update the position to a position shifted towards the reference radius position.

Next, an example of the relationship between the positioning error PE and the consumed write count will be described.

For example, the consumed write count increases monotonically. As the distance (absolute value of the positioning error PE) from the reference radius position of the write head WHD at the time when the data is written to the n-th target sector RSC1$n$ of the second track STR1 becomes greater, the consumed write count increases.

Next, means and methods for stopping the write operations before the current write allowable count falls below 0 (zero) will be described. In order to stop the write operations before the current write allowable count falls below 0 (zero), a lower limit can be set for the current write allowable count.

The determination unit 65 can permit the write processing executed by the write processing unit 62 during the period when it is determined that the current write allowable count does not fall below the reference count. In contrast, the determination unit 65 can prohibit the write processing executed by the write processing unit 62 during the period when it is determined that the current write allowable count falls below the reference count. Incidentally, the reference count is a numerical value between the initial write allowable count and 0 times. The undesirable situation that current write allowable count falls below 0 (zero) can be thereby avoided.

Next, a relationship between the distance (absolute value of the positioning error PE) from the reference radius position of the write head WHD and the BER at the time when the data is written k times to the n-th target sector RSC1$n$ of the second track STR1 will be described. FIG. 11 is a graph showing a variation of BER of the n-th target sector RSC0$n$ of the first track STR0 to a displacement amount e of the write head WHD from the reference radius position to the first direction da, at every write count k.

As shown in FIG. 11 and FIG. 10B, the BER is conventionally expressed in the common logarithm ($\log_{10}$).

For example, when the error rate is 1 bit in 100 bits, then BER=$\log_{10}(1/100)$=−2.0.

In addition, when the error rate is 2 bits in 100 bits, then BER=$\log_{10}(2/100)$≈−1.7.

It can be understood that the quality of the data in the target sector RSC0$n$ is higher as the BER is smaller.

The threshold value BERTH is set to −1.70 here. The displacement amount e is the absolute value of the positioning error PE.

For example, if the data is written once to the n-th target sector RSC1$n$ of the second track STR1 in a state in which the displacement amount e of the write head WHD in the first direction da is 0.3 [Track], the BER becomes greater (worse) than threshold value BERTH. It is therefore determined that the target sector RSC1$n$ becomes a corrupted target sectors CSC. In this case, 0.3 [Track] is equivalent to the length of 30% of the pitch STP. As understood from FIG. 11, the BER can easily be worse even if the displacement amount e increases, and the BER can easily be worse even if the write count k increases.

Figure 12:
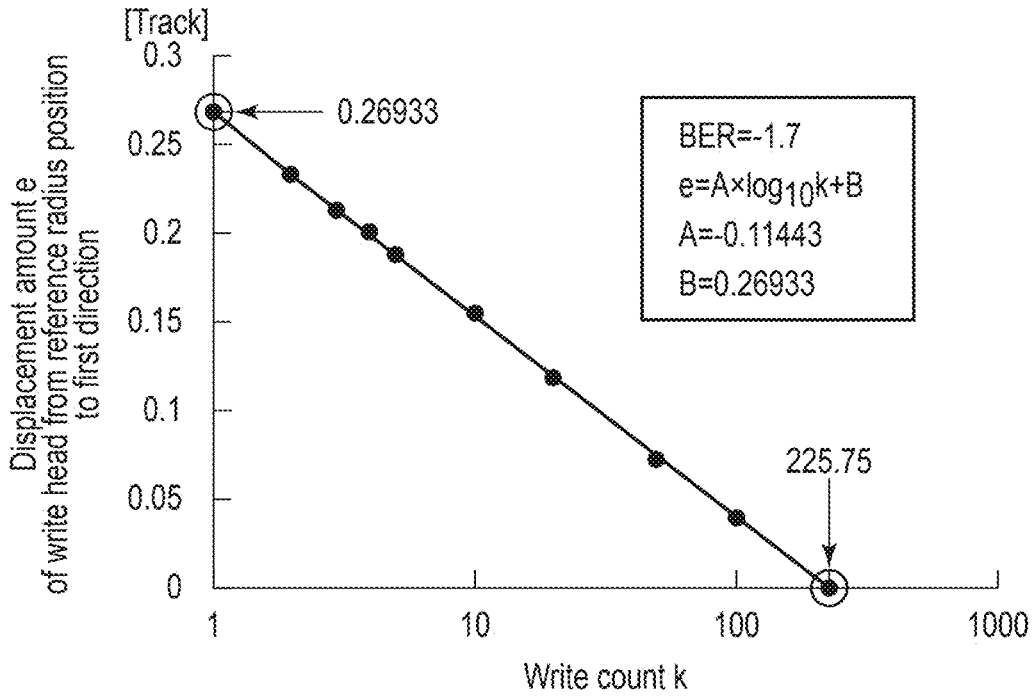
FIG. 12 is a graph showing the variation of the displacement amount to the write count.

Next, a relationship between the number of times k of writing the data to the n-th target sector RSC1$n$ of the second track STR1, and the displacement amount e will be described. FIG. 12 is a graph showing variation in the displacement amount e with respect to the write count k of the data to the n-th target sector RSC1$n$ of the second track STR1. In FIG. 12, the threshold value BERTH is also set to −1.70.

As shown in FIG. 12 and FIG. 10B, if A and B are constants, a relationship e=A×$\log_{10}$ k+B holds.

The values of the constants A and B shown in FIG. 12 are examples, and are adjusted according to the characteristics of the disk DK, the characteristics of the head HD, the value of the threshold value BERTH, and the like. It can be understood that there is a proportional relationship between logarithm ($\log_{10}$ k) of the write count k and the displacement amount e. In this example, since the constant (proportional constant) A is a negative number, the displacement amount e becomes smaller as the logarithm ($\log_{10}$ k) becomes greater.

It can be understood that, for example, the BER of the target sector RSC0$n$ is substantially −1.7 in both of a case where the data is written to the target sector RSC1$n$ 226 times in a state in which e=0 and the write head WHD is in the ideal position, and a case where the data is written to the target sector RSC1$n$ once in a state in which e=0.27 [Track].

In other words, if the write operation is performed at the above pitch STP at which it is ensured that |ITMm|=0.27 [Track], then in the write process with e=0.27[Track], the target sector RSC0$n$ becomes a corrupted target sector CSC, by writing the data only once to the target sector RSC1$n$, and an error occurs in the read processing for the data in the target sector RSC0$n$. In addition, if the data is written to the target sector RSC1$n$ 226 times in a state in which e=0, the target sector RSC0$n$ also becomes the corrupted target sector CSC.

As understood from the above, the magnetic disk device 1 can monitor whether the target sector RSC0$n$ reaches the read limit on not a track basis, but a sector basis, and can provide feedback to the write processing for the target sector RSC1$n$ before the target sector RSC0$n$ reaches the read limit.

Next, a relationship among the displacement amount e, the updated write allowable count, and the consumed write count will be described together with the initial write allowable count and the initial first assurance distance. FIG. 13 is a graph in which the variation in the initial write allowable count CNTm and the initial first assurance distance TMrm0 (initial first track margin ITMm), and the variation in the updated write allowable count CNTm and the consumed write count ΔCNTm to the displacement amount e, are plotted.

In FIG. 13, the relationship between the displacement amount e and the write count k in FIG. 12 is replotted to the relationship between the displacement amount e and the updated write allowable count CNTm, and replotted to the relationship between the displacement amount e and the consumed write count ΔCNTm. The initial write allowable count CNTm, the updated write allowable count CNTm, and the consumed write count ΔCNTm are expressed on a logarithmic axis of the common logarithm.

As shown in FIG. 13 and FIG. 10B, it can be understood that when the consumed write count ΔCNTm is expressed on the logarithmic axis of the common logarithm, the consumed write count ΔCNTm changes linearly with respect to the distance (displacement amount e) from the reference radius position of the write head WHD.

First, an initial state in which after the data is written to the n-th target sector RSC0$n$ of the first track STR0, no data is written to the n-th target sector RSC1$n$ of the second track STR1 will be focused. In the initial state, as understood from plot point PL1, if the absolute value of the initial first assurance distance TMrm0 during the write processing for the target sector RSC1$n$ is 0.270 [Track], the initial write allowable count CNTm is substantially 229 times.

After that, a case where the data is written once for the target sector RSC1$n$ and the first write error occurs will be focused. The position of the write head WHD exceeds the initial first write suspending position ISPm in the first direction da. As understood from plot point PL2, when the displacement amount e (or |PE|) is 0.15 [Track], the consumed write count ΔCNTm is substantially 20.45 times. A formula for calculating the consumed write count ΔCNTm is as follows:

$$\Delta CNTm = 10^{\wedge}(|PE|/A)$$

$$= 10^{\wedge}(0.15/0.11443)$$

$$\approx 20.45$$

The updated write allowable count CNTm obtained after writing the data once to the target sector RSC1$n$ as described above is substantially decreased to 208.55 times as understood from the plot point PL3. The updated write allowable count CNTm can be calculated using the following formula for subtracting the consumed write count ΔCNTm (20.45) from the initial write allowable count CNTm (229 times).

$$CNTm = CNTm - \Delta CNTm = 229 - 20.45 = 208.55$$

An absolute value of an updated first assurance distance TMrm obtained when the updated write allowable count CNTm is decreased to 208.55 times is substantially 0.2653 [Track], and can be calculated using the following formula.

$$|TMrm|=A\times\log_{10} k$$

$$=0.11443\times\log_{10}(208.55)$$

$$\approx 0.2653$$

Next, a case where the data is subjected to write retry for the target sector RSC1$n$ and a second write error occurs will be focused. The position of the write head WHD exceeds the current first write suspending position CSPm (updated first write suspending position) in the first direction da. As understood from plot point PL4, when the displacement amount e (or |PE|) is 0.18 [Track], the consumed write count ΔCNTm is substantially 37.41 times. A formula for calculating the consumed write count ΔCNTm is as follows:

$$\Delta CNTm=10\char`\^(|PE|/A)$$

$$=10\char`\^(0.18/0.11443)$$

$$\approx 37.41$$

The updated write allowable count CNTm obtained after writing the data twice to the target sector RSC1$n$ as described above is substantially reduced to 171.14 times as understood from the plot point PL5. The updated write allowable count CNTm can be calculated using the following formula for subtracting the consumed write count ΔCNTm (37.41) from the updated write allowable count CNTm (208.55 times) obtained immediately before.

$$CNTm=CNTm-\Delta CNTm=208.55-37.41=171.14$$

The absolute value of the updated first assurance distance TMrm obtained when the updated write allowable count CNTm is decreased to 171.14 times is substantially 0.2653 [Track], and can be calculated using the following formula.

$$|TMrm|=A\times\log_{10} k$$

$$=0.11443\times\log_{10}(171.14)$$

$$\approx 0.2555$$

As described above, every time the data is written to the target sector RSC1$n$, the updated write allowable count CNTm is updated based on the displacement amount e (positioning error PE), and the updated first assurance distance (remaining track margin on the target sector RSC0$n$ side) TMrm is updated. As the number of write count retries for the target sector RSC1$n$ increases, the absolute value of the updated first assurance distance TMrm decreases. Therefore, by tightening the updated first write-off track slice (updated first write-off track slice WOSm to be described later) from the initial first write-off track slice IWOSm in accordance with the decrease in the absolute value of the updated first assurance distance TMrm, the data in the adjacent target sector RSC0$n$ can be secured.

In the example shown in FIG. 13, each time the data is written to the target sector RSC1$n$, the position of the write head WHD exceeds the current first write suspending position CSPm in the first direction da. However, even if the position of the write head WHD does not exceed the current first write suspending position CSPm in the first direction da, the updated first assurance distance TMrm and the updated first write off-track slice WOSm may be updated.

FIG. 14 is a block diagram showing an example of the positioning control system SY of the head HD, and the adjustment unit 64. FIG. 15 is a schematic diagram showing an example of the first track STR0, the second track STR1, and the third track STR2 of the magnetic disk device 1, illustrating not only a negative index, but also a positive index during write processing in the second track.

Incidentally, the track STR in FIG. 15 is a track in which the data is written in the shingled magnetic recording (SMR), but may be a track in which the data is written in the conventional magnetic recording (CMR).

As shown in FIG. 14 and FIG. 15, the magnetic disk device 1 comprises the positioning control system SY of the head HD. The positioning control system SY comprises a transducer (Physical target Transducer For Writing) TD, a subtracter SU1, a controller CL, and an actuator P.

The transducer TD, the subtracter SU1, and the controller CL are included in, for example, the head amplifier IC 130, the system controller 110, and the like. The actuator P is composed of, for example, an arm 30, a VCM 24, and the like. The subtracter SU1, the controller CL, and the actuator P constitute a feedback system.

The host 100 instructs the magnetic disk device 1 for address (C, H, S) of a sector of a write target. With respect to the sector of the write target, C is the track number (cylinder number), H is the head number, and S is the sector number. The transducer TD then converts the address to a distance R corresponding to the track number C and outputs the distance. The information on the distance R is input to the subtracter SU1.

A physical radius position Yr of the head HD can be obtained by reading and demodulating the servo information on the disk DK. The subtracter SU1 outputs the positioning error PE, which is the information obtained by subtracting the distance R from the physical radius position Yr, to the controller CL (PE=Yr−R). In order to achieve stable positioning control with the controller CL, the controller CL can obtain a control amount AU by applying gain compensation and phase compensation to the positioning error PE. Then, by driving the actuator P using the control amount AU as the input, positioning the head HD to the write target position (radius position) can be controlled.

The adjustment unit 64 comprises an arithmetic unit CA, a processing unit PR, a comparator AM1, a comparator AM2, and an OR circuit OC.

The positioning error PE is compared with the current first write-off track slice CWOSm in the comparator AM1. If the positioning error PE exceeds the current first write-off track slice CWOSm on the negative side, a write error flag ERR is output from the OR circuit OC. In addition, the positioning error PE is also compared with the current second write-off track slice CWOSp in the comparator AM2. The current second write-off-track slice CWOSp is the slice on the positive side (the second direction db side from the track center STC1). If the positioning error PE exceeds the current second write-off-track slice CWOSp on the positive side, the write error flag ERR is also output from the OR circuit OC. Based on the above, during performing the write processing for the n-th target sector RSC1$n$ of the second track STR1, the write error flag ERR is output when the write head WHD is displaced from the track center STC1 in the first direction da or the second direction db by a predetermined distance or more.

When the write error flag ERR is output, the write processing unit 62 suspends write processing. When the write error flag ERR is output from the OR circuit OC, the write error flag ERR is input to the arithmetic unit CA. The arithmetic unit CA is configured to execute an arithmetic operation when the write error flag ERR is input. The information on the positioning error PE is also input to the arithmetic unit CA.

The arithmetic unit CA calculates and updates the updated write allowable count CNTm for the target sector RSC0$n$ (target sector adjacent to the outer circumference side) located in the first direction da, based on a sign (+ or –) of the positioning error PE and the absolute value of the positioning error PE. Alternatively, the calculation unit CA calculates and updates the updated write allowable count CNTp for the target sector RSC2$n$ (target sector adjacent to the inner circumference side) located in the second direction db.

Incidentally, the updated write allowable count CNTm, which is an index on the negative side from the track center STC1, is different from the updated write allowable count CNTp, which is an index on the positive side from the track center STC1, but the updated write allowable count CNTp can be deduced from the updated write allowable count CNTm and its detailed description will be omitted.

As described above, after the arithmetic unit CA updates the updated write allowable count CNTm or the updated write allowable count CNTp, the arithmetic unit CA calculates and updates the updated first assurance distance TMrm, based on the updated write allowable count CNTm, and then calculates and updates a residual ratio TMRm. The above residual ratio TMRm is the ratio of the updated first assurance distance TMrm to the initial first assurance distance TMrm0.

Alternatively, the arithmetic unit CA calculates and updates the updated second assurance distance TMrp, based on the updated write allowable count CNTp, and then calculates and updates the residual ratio TMRp. The residual ratio TMRp is the ratio of the updated first assurance distance TMrp to the initial second assurance distance TMrp0.

Incidentally, the updated first assurance distance TMrm, the residual ratio TMRm, the initial first assurance distance TMrm0, and the updated first assurance distance TMrm, which are indices on the negative side from the track center STC1, are different from the updated second assurance distance TMrp, the residual ratio TMRp, the initial second assurance distance TMrp0, and the updated first assurance distance TMrp, which are indices on the positive side from the track center STC1. However, the updated second assurance distance TMrp, the residual ratio TMRp, the initial second assurance distance TMrp0, and the updated first assurance distance TMrp can be deduced from the updated first assurance distance TMrm, the residual ratio TMRm, the initial first assurance distance TMrm0, and the updated first assurance distance TMrm, and their detailed descriptions will be omitted.

The information on the residual ratio TMRm and the residual ratio TMRp is input to the processing unit PR. The information on the initial write-off track slice IWOS0 is further input to the processing unit PR. Based on the initial write-off track slice IWOS0, the initial first write-off track slice IWOSm and the initial second write-off track slice IWOSp can be derived. A relationship among the initial write-off track slice IWOS0, the initial first write-off track slice IWOSm, and the initial second write-off track slice IWOSp is as follows.

$$IWOS0=IWOSp=-IWOSm$$

Incidentally, the initial first write-off track slice IWOSm, which is an index on the negative side from the track center STC1, is different from the initial second write-off track slice IWOSp, which is an index on the positive side from the track center STC1. However, the initial second write-off track slice IWOSp can be deduced from the initial first write-off track slice IWOSm, and its detailed description will be omitted.

The processing unit PR calculates and updates the current first write off-track slice CWOSm by multiplying the initial first write off-track slice IWOSm by the residual ratio TMRm. For example, the processing unit PR updates the current first write off-track slice CWOSm to the updated first write suspending distance UWOSm. Furthermore, the processing unit PR calculates and updates the current second write off-track slice CWOSp by multiplying the initial second write off-track slice IWOSp by the residual ratio TMRp. For example, the processing unit PR updates the current second write off-track slice CWOSp to the updated second write suspending distance UWOSp. The updated second write suspending distance UWOSp is an index on the positive side from the track center STC1.

As described above, the adjustment unit 64 can update the initial first write off-track slice IWOSm to the updated first write suspending distance UWOSm, and can update the initial second write off-track slice IWOSp to the updated second write suspending distance UWOSp.

When the write processing for the n-th target sector RSC1$n$ of the second track STR1 is completed, the updated write allowable count CNTm and the updated write allowable count CNTp can be reset to their initial values by inputting a reset signal RST to the arithmetic unit CA.

Executing, after the write processing for the n-th target sector RSC1$n$ of the second track STR1 is completed, the write processing of writing the other data to the n-th target sector RSC1$n$ of the second track STR1, will be focused here. The initial write allowable count CNTm and the initial write allowable count CNTp may be set in the arithmetic unit CA. However, the previous updated write allowable count CNTm and updated write allowable count CNTp may be set using the information stored in the storage medium. Since the previous updated write allowable count CNTm and updated write allowable count CNTp can be carried over, monitoring can be started from not the plot point PL1, but the plot point PL5, as shown in the example of FIG. 13. This can further contribute to securing the data in the adjacent target sectors RSC0$n$ and RSC2$n$.

Means and methods for securing the data of both the target sector RSC0$n$ and the target sector RSC2$n$ will be described with reference to FIG. 1 and FIG. 15.

As shown in FIG. 1 and FIG. 15, the disk DK includes a plurality of target sectors RSC and has the third track STR2 adjacent to the second track STR1. The n-th target sector RSC2$n$ of the third track STR2 is adjacent to the n-th target sector RSC1$n$ of the second track STR1 in the radial direction d1. The third track STR2 is located in the second direction db with respect to the second track STR1.

The adjustment unit 64 can further adjust the current second assurance position CGPp which is located in the second direction db relative to the reference radius position, and the current second write suspending position CSPp which is located between the reference radius position and the current second assurance position CGPp.

The current second assurance position CGPp is the limit position of the write head WHD where it is assured that the data of the n-th target sector RSC2$n$ of the third track STR2 can be read when the data is written to the n-th target sector RSC1$n$ of the second track STR1.

The current second write suspending position CSPp is the limit position of the write head WHD in the second direction db where writing the data to the n-th target sector RSC1$n$ of the second track STR1 can be permitted.

When the determination unit 65 determines that the data has been written to the n-th target sector RSC1$n$ of the second track STR1, the adjustment unit 64 can tighten each of the current first assurance position CGPm and the current first write suspending position CSPm. In other words, if the positioning error PE is a negative value, the adjustment unit 64 can update the current first assurance position CGPm and the current first write suspending position CSPm to positions displaced towards the reference radius position (track center STC1) side. In other words, the adjustment unit 64 can update the current first track margin CTMm and the current first write-off track slice CWOSm to more stringent values, and can update the current first track margin CTMm and the current first write-off track slice CWOSm to negative values closer to 0 (zero). Therefore, the magnetic disk device 1 can contribute to securing the data in the target sector RSC0$n$.

Alternatively, the adjustment unit 64 can tighten each of the current second assurance position CGPp and the current second write suspending position CSPp. In other words, if the positioning error PE is a positive value, the adjustment unit 64 can update the current second assurance position CGPp and the current second write suspending position CSPp to positions displaced towards the reference radius position (track center STC1) side. In other words, the adjustment unit 64 can update the current second track margin CTMp and the current second write-off track slice CWOSp to more stringent values, and can update the current second track margin CTMp and the current second write-off track slice CWOSp to positive values closer to 0 (zero). Therefore, the magnetic disk device 1 can contribute to securing the data in the target sector RSC2$n$.

Alternatively, the adjustment unit 64 can tighten each of the current first assurance position CGPm, the current first write suspending position CSPm, the current second assurance position CGPp, and the current second write suspending position CSPp. In other words, if the positioning error PE is 0 (zero), the adjustment unit 64 can update the current first assurance position CGPm, the current first write suspending position CSPm, the current second assurance position CGPp, and the current second write suspending position CSPp to positions displaced towards the reference radius position (track center STC1) side. Therefore, the magnetic disk device 1 can contribute to securing the data in the target sector RSC0$n$ and the data in the target sector RSC2$n$.

When the determination unit 65 further determines that the position of the write head WHD exceeds the current second write suspending position CSP in the second direction db, the write processing unit 62 can suspend the write processing. For example, since the write processing unit 62 changes the schedule for the write processing and suspends writing the data to an n+1-th target sector of the second track STR1, the suspension can contribute to securing the data in the n+1-th target sector of the first track STR0 and the n+1-th target sector of the third track STR2.

Figure 16A:
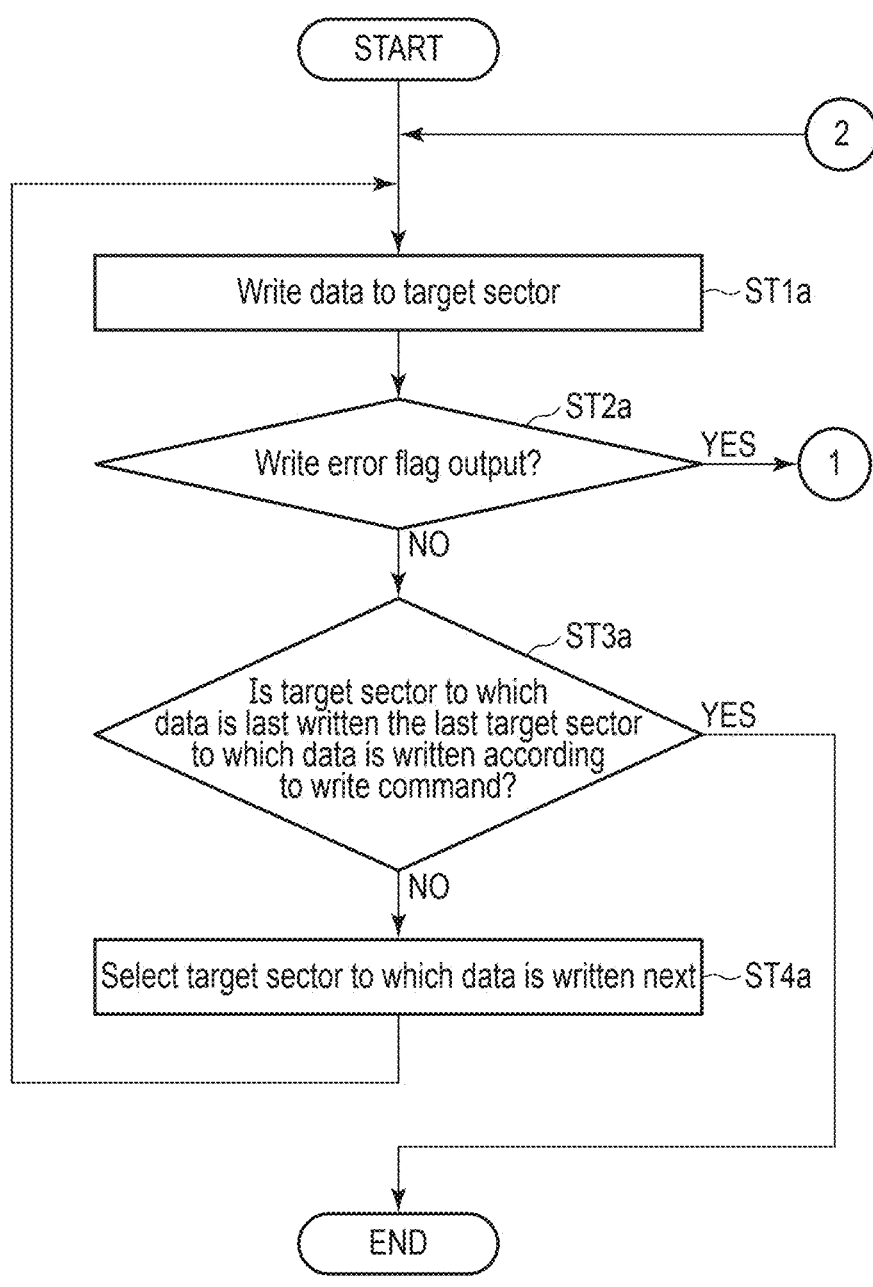
FIG. 16A is a flowchart showing a write processing method which can secure data on the disk.

Next, a write processing method which can secure the data on the disk DK will be described with reference to FIG. 16A, FIG. 16B, and the like. FIG. 16A is a flowchart showing the write processing method which can secure the data on the disk DK. FIG. 16B is a flowchart showing the write processing method following FIG. 16A.

As shown in FIG. 16A, FIG. 1, and FIG. 15, when the write processing is started in accordance with the received write command, the write processing unit 62 first writes the data to a selected target sector RSC, in step ST1$a$. Next, in step ST2$a$, the determination unit 65 determines whether or not the write error flag ERR is output.

If the write error flag ERR is not output (step ST2$a$, NO), the processing shifts to step ST3$a$, and the determination unit 65 determines whether or not a target sector RSC to which data is last written is the last target sector to which data is written in accordance with the write command. If the target sector is not the last target sector (step ST3$a$, NO), the processing shifts to step ST4$a$, and the write processing unit 62 selects a target sector RSC to which the data is to be next written, and the processing shifts to step ST1$a$.

In contrast, if the target sector is the last target sector (step ST3$a$, YES), the write processing is ended.

Then, if the write error flag ERR is output (step ST2$a$, YES), the processing shifts to step ST1$b$ in FIG. 16B.

As shown in FIG. 16B, FIG. 1, and FIG. 15, the adjustment unit 64 determines whether the positioning error PE is 0 (zero) or more, in step ST1$b$. If the positioning error PE is less than 0 (zero) (step ST1$b$, NO), the processing shifts to step ST2$b$, and the adjustment unit 64 calculates the current write allowable count, which is the number of times of permitting the data to be written to the n-th target sector RSC1$n$ of the second track STR1, by considering securing the data of the n-th target sector RSC0$n$ of the first track STR0. The current write allowable count is the updated write allowable count CNTm.

Next, the adjustment unit 64 calculates the updated first assurance distance TMrm in step ST3$b$, calculates the residual ratio TMRm in step ST4$b$, and calculates the current first write-off track slice CWOSm in step ST5$b$. After the current first write-off track slice CWOSm is tightened, the processing can shift to step ST1$a$ in FIG. 16A.

In contrast, if the positioning error PE is 0 (zero) or more (step ST1$b$, YES), the processing shifts to step ST6$b$, and the adjustment unit 64 calculates the current write allowable count, which is the number of times of permitting the data to be written to the n-th target sector RSC1$n$ of the second track STR1, by considering securing the data of the n-th target sector RSC2$n$ of the third track STR2. The current write allowable count is the updated write allowable count CNTp.

Next, the adjustment unit 64 calculates the updated second assurance distance TMrp in step ST7$b$, calculates the residual ratio TMRp in step ST8$b$, and calculates the current second write-off track slice CWOSp in step ST9$b$. After the current second write-off track slice CWOSp is tightened, the processing can shift to step ST1$a$ in FIG. 16A.

According to the magnetic disk device 1 and the write processing method of the first embodiment configured as described above, the magnetic disk device 1 comprises the disk DK, the head HD, the read processing unit 63, the write processing unit 62, the adjustment unit 64, and the determination unit 65.

The adjustment unit 64 can adjust the current first assurance position CGPm which is located in the first direction da relative to the reference radius position, and the current first write suspending position CSPm which is located between the reference radius position and the current first assurance position CGPm.

When the determination unit 65 determines that the data has been written to the target sector RSC1$n$, the adjustment unit 64 can tighten each of the current first assurance position CGPm and the current first write suspending position CSPm. In other words, the adjustment unit 64 can update the current first assurance position CGPm and the current first write suspending position CSPm to a position shifted towards the reference radius position (track center STC1) side. Therefore, the magnetic disk device 1 can avoid the situation in which the quality of the data in the target sector RSC0$n$ may be deteriorated.

When the determination unit 65 further determines that the position of the write head WHD exceeds the current first write suspending position CSPm, the write processing unit 62 can suspend write processing. For example, since the write processing unit 62 changes the schedule for the write processing and suspends writing the data to the n+1-th target sector of the second track STR1, the magnetic disk device 1 can avoid the situation in which the quality of the data in the n+1-th target sector of the first track STR0 may be deteriorated and the situation in which the quality of the data in the n+1-th target sector of the third track STR2 may be deteriorated.

Based on the above, the magnetic disk device 1 and the write processing method that can secure the data on the disk DK can be obtained. Alternatively, the magnetic disk device 1 and the write processing method that can suppress deterioration of the quality of the data on the disk DK can be obtained. Alternatively, the magnetic disk device 1 and the write processing method that can avoid the situation in which the quality of the data in the adjacent target sector RSC0$n$ may be deteriorated even if the data is continuously written to the same target sector RSC1$n$, can be obtained. Alternatively, the magnetic disk device 1 and the write processing method that can tighten the allowable amount of displacement amount e of the write head WHD during the write processing or reset the allowable amount to the initial value, can be obtained.

Second Embodiment

Next, a second embodiment will be described. A magnetic disk device 1 is configured in the same manner as the magnetic disk device 1 of the first embodiment except for constituent elements to be described in the second embodiment. A write processing method is the same as the procedure of the write processing method of the first embodiment described above, except for the procedure described in this second embodiment.

FIG. 17A is a schematic diagram showing an example of deriving a positioning error PE which is expected when writing data to the n-th target sector RSC1$n$ of a second track STR1 in the magnetic disk device 1 according to the second embodiment, illustrating the positioning error PE detected at regular intervals Pd during a specific period immediately before writing data to the n-th target sector RSC1$n$ in the second track STR1 and the positioning error PE which is expected when writing data to the n-th target sector RSC1$n$.

FIG. 17B is a schematic diagram showing another example of deriving the positioning error PE which is expected when writing data to the n-th target sector RSC1$n$ of the second track STR1 in the magnetic disk device 1 according to the second embodiment, illustrating the positioning error PE detected at regular intervals Pd during the specific period immediately before writing data to the n-th target sector RSC1$n$ in the second track STR1 and the positioning error PE which is expected when writing data to the n-th target sector RSC1$n$.

As shown in FIG. 1, FIG. 17A, and FIG. 17B, the read processing unit 63 can derive the position information of the write head WHD in the radial direction d1 of the specific period immediately before writing data to the n-th target sector RSC1$n$ of the second track STR1, and can predict the position of the write head WHD when the data is assumed to be written to the n-th target sector RSC1$n$ of the second track STR1.

In the example in FIG. 17A, since the reduction amount of the positioning error PE is equally reduced by −0.05 [Track] each time, the read processing unit 63 can predict that the positioning error PE at the time of assuming that the data is written to the target sector RSC1$n$ may be −0.20 [Track].

In the example in FIG. 17B, since the reduction amount of the positioning error PE is reduced by half to −0.08 [Track] and −0.04 [Track], the read processing unit 63 can predict that the positioning error PE at the time of assuming that the data is written to the target sector RSC1$n$ may be −0.22 [Track].

The prediction of the positioning error PE can be executed using a generally known method, and can be generated by using, for example, a differential value from the sample of the positioning error PE in a specific period immediately before writing the data to the n-th target sector RSC1$n$ of the second track STR1, or can be calculated using regression calculation.

When the determination unit 65 determines that the predicted position of the write head WHD exceeds the current first write suspending position CSPm in the first direction da, the write processing unit 62 can suspend the write processing for the n-th target sector RSC1$n$ of the second track STR1.

In contrast, when the determination unit 65 determines that the predicted position of the write head WHD does not exceed the current first write suspending position CSPm, the write processing unit 62 can execute the write processing for the n-th target sector RSC1$n$ of the second track STR1.

In the magnetic disk device 1 and the write processing method according to the second embodiment configured as described above, the same advantages as the first embodiment can also be obtained. The magnetic disk device and the write processing method that can also secure the data on the disk by predicting the positioning error PE can be obtained.

The technique of the second embodiment for executing the write processing by predicting the positioning error PE, may be used together with or in place of the technique of the first embodiment for executing the write processing by tightening the current first write-off track slice CWOSm or the current second write-off track slice CWOSp.

Third Embodiment

Next, a third embodiment will be described. A magnetic disk device 1 is configured in the same manner as the magnetic disk device 1 of the first embodiment except for constituent elements to be described in the third embodiment. A write processing method is the same as the procedure of the write processing method of the first embodiment described above, except for the procedure described in this third embodiment.

FIG. 18A is a schematic diagram showing an example of n-th target sectors RSC0$n$, RSC1$n$, and RSC2$n$ of the respective first track CTR0, second track CTR1, and third track CTR2, of the magnetic disk device 1 according to the third embodiment, illustrating a state in which a distance from a target position of a write head WHD to a current first write suspending position CSPm (|CWOSm|) is different from a distance from the target position to a current second write suspending position CSPp (|CWOSp|).

FIG. 18B is a schematic diagram showing an example of the n-th target sectors RSC0$n$, RSC1$n$, and RSC2$n$ of the respective first track CTR0, second track CTR1, and third track CTR2, of the magnetic disk device 1 according to the third embodiment, illustrating a state in which a distance from the target position of the write head WHD to a current first write suspending position CSPm (|CWOSm|) is equal to the distance from the target position to the current second write suspending position CSPp (|CWOSp|).

Incidentally, in the third embodiment, the write processing for the conventional magnetic recording area of the user data area U will be focused. A track CTR in FIG. 18A and FIG. 18B is a track where the data is written by conventional magnetic recording (CMR). However, the track CTR in FIG. 18A and FIG. 18B may also be a track (STR) where the data is written by shingled magnetic recording (SMR).

As shown in FIG. 18A and FIG. 1, if only one of the current first write-off track slice CWOSm and the current second write-off track slice CWOSp is tightened, the write head WHD can easily exceed the write suspending position CSP of the tightened side, the frequency of occurrence of write errors may increase, and the deterioration in the write performance of the magnetic disk device 1 is concerned. For example, if only the first write-off track slice CWOSm is tightened, the write head WHD is more likely to exceed the current first write suspending position CSPm in the first direction da.

As shown in FIG. 18B and FIG. 1, the adjustment unit 64 can adjust the target position of the write head WHD during the write processing for the n-th target sector RSC1$n$ of the second track CTR1.

When the current first write suspending position CSPm is updated to a position displaced in the second direction db, the adjustment unit 64 can update the reference radius position (track center CTC1 of the n-th target sector RSC1$n$ of the second track CTR1) to a position displaced in the second direction db.

In addition, when the current second write suspending position CSPp is updated to a position displaced in the first direction da, the adjustment unit 64 can update the reference radius position (track center CTC1 of the n-th target sector RSC1$n$ of the second track CTR1) to a position displaced in the first direction da.

Since the situation in which the write head WHD is likely to easily exceed either the current first write suspending position CSPm or the current second write suspending position CSPp can be reduced, the degradation in the write performance of the magnetic disk device 1 can be suppressed.

For example, the adjustment unit 64 may update the reference radius position (track center CTC1) to a neutral line where the distance from the current first write suspending position CSPm is equal to the distance from the current second write suspending position CSPp in the radial direction d1. Since the situation in which the write head WHD is likely to easily exceed either the current first write suspending position CSPm or the current second write suspending position CSPp can be further reduced, the degradation in the write performance of the magnetic disk device 1 can be further suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described technique may be applied not only to the magnetic disk device of the hybrid recording, but also to the magnetic disk device of the shingled magnetic recording and the magnetic disk device of the conventional magnetic recording.

What is claimed is:

1. A magnetic disk device comprising:
a disk having a first data track and a second data track adjacent to each other in a recording layer, the first data track and the second data track each including a plurality of target sectors being targets to which data are to be written, an n-th target sector of the first data track being adjacent to an n-th target sector of the second data track in a radial direction of the disk, the first data track being located in a first direction parallel to the radial direction with respect to the second data track;
a head including a write head writing data to the recording layer and a read head reading data from the recording layer;
a read processing unit which derives position information on the write head in the radial direction by seeking the read head and which reads the data written to the recording layer;
a write processing unit which executes write processing of writing data to the recording layer, and setting a target position of the write head in the radial direction to a reference radius position when writing data to the n-th target sector of the second data track;
an adjustment unit capable of adjusting a current first assurance position which is located in the first direction relative to the reference radius position, and a current first write suspending position which is located between the reference radius position and the current first assurance position, the current first assurance position being a limit position of the write head, which assures enabling data of the n-th target sector of the first data track to be read, the current first write suspending position being a limit position of the write head in the first direction where writing data to the n-th target sector of the second data track can be permitted; and
a determination unit,
wherein
when the determination unit determines that data has been written to the n-th target sector of the second data track, the adjustment unit is capable of tightening each of the current first assurance position and the current first write suspending position and updating the positions to positions displaced towards the reference radius position side, and
when the determination unit further determines that the position of the write head has exceeded the current first write suspending position, the write processing unit suspends write processing.
2. The magnetic disk device of claim 1, wherein
when the determination unit determines that data has been written to the n-th target sector of the second data track and that the position of the write head has exceeded the current first write suspending position, the adjustment unit tightens each of the current first assurance position and the current first write suspending position and updates the positions to positions displaced towards the reference radius position side, and when the determination unit determines that data has been written to the n-th target sector of the second data track and that the position of the write head has not exceeded the current first write suspending position, the adjustment unit maintains the current first assurance position and the current first write suspending position.

3. The magnetic disk device of claim 1, further comprising:

a storage medium;

a counter counting the number of write count of the n-th target sector of the first data track when the data is written to the n-th target sector of the second data track, and updating the total number of the write count in the storage medium; and a refresh processing unit reading target data of the n-th target sector of the first data track, rewriting the target data to the n-th target sector of the first data track, and resetting the total number of the write count recorded in the storage medium when the determination unit determines that the total number of the write count exceeds the reference number of times, wherein the current first assurance position is an initial first assurance position or an updated first assurance position which is tightened relative to the initial first assurance position, the current first write suspending position is the initial first write suspending position or an updated first write suspending position tightened relative to the initial first write suspending position, and when the refresh processing unit rewrites the target data to the n-th target sector of the first data track and resets the total number of the write count, the adjustment unit resets the current first assurance position to the initial first assurance position, and resets the current first write suspending position to the initial first write suspending position.

4. The magnetic disk device of claim 3, wherein when the determination unit determines that the updated first write suspending position is located on the reference radius position side relative to a reference first write suspending position, the refresh processing unit rewrites the target data to the n-th target sector of the first data track and resets the total number of the write count, the adjustment unit resets the current first assurance position to the initial first assurance position and resets the current first write suspending position to the initial first write suspending position, and the reference first write suspending position is located on the reference radius position side relative to the initial first write suspending position.

5. The magnetic disk device of claim 1, wherein the current first assurance position is an initial first assurance position or an updated first assurance position which is tightened relative to the initial first assurance position, the current first write suspending position is the initial first write suspending position or an updated first write suspending position tightened relative to the initial first write suspending position, in the radial direction, if a distance from the reference radius position to the initial first assurance position is defined as an initial first assurance distance, if a distance from the reference radius position to the updated first assurance position is defined as an updated first assurance distance, if a distance from the reference radius position to the initial first write suspending position is defined as an initial first write suspending distance, and if a distance from the reference radius position to the updated first write suspending position is defined as an updated first write suspending distance, and the adjustment unit calculates a residual ratio, which is a ratio of the updated first assurance distance to the initial first assurance distance, calculates the updated first write suspending distance by multiplying the residual ratio by the initial first write suspending distance, and derives the updated first write suspending position.

6. The magnetic disk device of claim 5, wherein a current write allowable count, which is the number of times of allowing writing the data to the n-th target sector of the second data track, is an initial write allowable count or an updated write allowable count decreased from the initial write allowable count, and the adjustment unit calculates a consumed write count based on a distance from the reference radius position of the write head when data is written to the n-th target sector of the second data track, updates the current write allowable count by subtracting the consumed write count from the current write allowable count, tightens the current first assurance position based on the updated current write allowable count, and updates the current first assurance position to a position displaced towards the reference radius position side.

7. The magnetic disk device of claim 6, wherein as a distance from the reference radius position of the write head at the time when data is written to the n-th target sector of the second data track becomes greater, the consumed write count increases.

8. The magnetic disk device of claim 7, wherein when the consumed write count is expressed on a logarithmic axis of common logarithm, the consumed write count changes linearly with respect to the distance from the reference radius position of the write head.

9. The magnetic disk device of claim 6, wherein the determination unit permits the write processing executed by the write processing unit during a period when it is determined that the current write allowable count does not fall below a reference count, the determination unit prohibits the write processing executed by the write processing unit during a period when it is determined that the current write allowable count falls below the reference count, and the reference count is a numerical value between the initial write allowable count and 0 times.

10. The magnetic disk device of claim 1, wherein the read processing unit derives position information of the write head in the radial direction of a specific period immediately before writing data to the n-th target sector of the second data track, and predicts a position of the write head when data is assumed to be written to the n-th target sector of the second data track, when the determination unit determines that the predicted position of the write head exceeds the current first write suspending position, the write processing unit suspends the write processing to the n-th target sector of the second data track, and when the determination unit determines that the predicted position of the write head does not exceed the current first write suspending position, the write processing unit executes the write processing to the n-th target sector of the second data track.

11. The magnetic disk device of claim 1, wherein the disk further has a third data track including a plurality of target sectors that are targets to which data is to be written and adjacent to the second data track, an n-th target sector of the third data track is adjacent to the n-th target sector of the second data track in the radial direction, the third data track is located in a second direction opposite to the first direction with respect to the second data track, the adjustment unit is capable of further adjusting a current second assurance position which is located in the second direction relative to the reference radius position, and a current second write suspending position which is located between the reference radius position and the current second assurance position, the current second assurance position is a limit position of the write head, which assures enabling data of the n-th target sector of the third target track to be read when writing data to the n-th target sector of the second data track, the current second write suspending position is a limit position of the write head in the second direction where writing the data to the n-th target sector of the second data track can be permitted, when the determination unit determines that data has been written to the n-th target sector of the second data track, the adjustment unit tightens each of the current first assurance position and the current first write suspending position and updates the positions to positions displaced towards the reference radius position side, or tightens each of the current second assurance position and the current second write suspending position and updates the positions to positions displaced towards the reference radius position side, or tightens each of the current first assurance position, the current first write suspending position, the current second assurance position, and the current second write suspending position, and updates the positions to positions displaced towards the reference radius position side, and when the determination unit further determines that the position of the write head has exceeded the current second write suspending position, the write processing unit suspends write processing.

12. The magnetic disk device of claim 11, wherein when the current first write suspending position is updated to the position displaced in the second direction, the adjustment unit updates the reference radius position to a position displaced in the second direction, and when the current second write suspending position is updated to the position displaced in the first direction, the adjustment unit updates the reference radius position to a position displaced in the first direction.

13. The magnetic disk device of claim 12, wherein the adjustment unit updates the reference radius position to a neutral line where a distance from the current first write suspending position is equal to a distance from the current second write suspending position in the radial direction.

* * * * *